United States Patent
Attarde et al.

(10) Patent No.: US 11,455,212 B2
(45) Date of Patent: Sep. 27, 2022

(54) BLOCK-LEVEL SINGLE INSTANCING

(71) Applicant: Commvault Systems, Inc., Tinton Falls, NJ (US)

(72) Inventors: Deepak Raghunath Attarde, Marlboro, NJ (US); Rajiv Kottomtharayil, Marlboro, NJ (US); Manoj Kumar Vijayan, Marlboro, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

(21) Appl. No.: 17/169,257

(22) Filed: Feb. 5, 2021

(65) Prior Publication Data

US 2021/0263803 A1    Aug. 26, 2021

Related U.S. Application Data

(60) Continuation of application No. 16/228,726, filed on Dec. 20, 2018, now Pat. No. 10,956,274, which is a
(Continued)

(51) Int. Cl.
*G06F 3/06* (2006.01)
*G06F 16/174* (2019.01)
*G06F 11/14* (2006.01)

(52) U.S. Cl.
CPC .......... *G06F 11/1453* (2013.01); *G06F 3/064* (2013.01); *G06F 3/067* (2013.01);
(Continued)

(58) Field of Classification Search
CPC .... G06F 11/1453; G06F 3/0617; G06F 3/064; G06F 3/067; G06F 11/1435;
(Continued)

(56) References Cited

U.S. PATENT DOCUMENTS 4,686,620 A    8/1987 Ng
4,713,755 A    12/1987 Worley, Jr. et al.
(Continued)

FOREIGN PATENT DOCUMENTS

EP    0259912    3/1988
EP    0405926    1/1991
(Continued)

OTHER PUBLICATIONS

U.S. Appl. No. 16/201,897, filed Nov. 27, 2018, Haridas.
(Continued)

*Primary Examiner* — Christopher D Birkhimer
(74) *Attorney, Agent, or Firm* — Commvault Systems, Inc.

(57) ABSTRACT

Described in detail herein are systems and methods for single instancing blocks of data in a data storage system. For example, the data storage system may include multiple computing devices (e.g., client computing devices) that store primary data. The data storage system may also include a secondary storage computing device, a single instance database, and one or more storage devices that store copies of the primary data (e.g., secondary copies, tertiary copies, etc.). The secondary storage computing device receives blocks of data from the computing devices and accesses the single instance database to determine whether the blocks of data are unique (meaning that no instances of the blocks of data are stored on the storage devices). If a block of data is unique, the single instance database stores it on a storage device. If not, the secondary storage computing device can avoid storing the block of data on the storage devices.

18 Claims, 9 Drawing Sheets

Related U.S. Application Data continuation of application No. 14/668,450, filed on Mar. 25, 2015, now abandoned, which is a division of application No. 14/049,463, filed on Oct. 9, 2013, now Pat. No. 9,058,117, which is a continuation of application No. 12/647,906, filed on Dec. 28, 2009, now Pat. No. 8,578,120.

(60) Provisional application No. 61/180,791, filed on May 22, 2009.

(52) U.S. Cl.
CPC ........ *G06F 3/0617* (2013.01); *G06F 11/1435* (2013.01); *G06F 11/1464* (2013.01); *G06F 16/1752* (2019.01); *G06F 11/1469* (2013.01); *G06F 2201/80* (2013.01); *G06F 2201/84* (2013.01)

(58) Field of Classification Search
CPC ............. G06F 11/1464; G06F 16/1752; G06F 11/1469; G06F 2201/80; G06F 2201/84
See application file for complete search history.

(56) References Cited

U.S. PATENT DOCUMENTS

| | | |
|---|---|---|
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,437,012 A | 7/1995 | Mahajan |
| 5,448,724 A | 9/1995 | Hayashi et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,604,862 A | 2/1997 | Midgely et al. |
| 5,606,686 A | 2/1997 | Tarui et al. |
| 5,619,644 A | 4/1997 | Crockett et al. |
| 5,628,004 A | 5/1997 | Gormley et al. |
| 5,634,052 A | 5/1997 | Morris |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,742,792 A | 4/1998 | Yanai |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,794,229 A | 8/1998 | French et al. |
| 5,806,057 A | 9/1998 | Gormley et al. |
| 5,812,398 A | 9/1998 | Nielsen |
| 5,813,008 A | 9/1998 | Benson |
| 5,813,009 A | 9/1998 | Johnson et al. |
| 5,813,017 A | 9/1998 | Morris |
| 5,822,780 A | 10/1998 | Schutzman |
| 5,862,325 A | 1/1999 | Reed et al. |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,940,833 A | 8/1999 | Benson |
| 5,950,205 A | 9/1999 | Aviani, Jr. |
| 5,974,563 A | 10/1999 | Beeler, Jr. |
| 5,990,810 A | 11/1999 | Williams |
| 6,021,415 A | 2/2000 | Cannon et al. |
| 6,026,414 A | 2/2000 | Anglin |
| 6,052,735 A | 4/2000 | Ulrich et al. |
| 6,073,133 A | 6/2000 | Chrabaszcz |
| 6,076,148 A | 6/2000 | Kedem et al. |
| 6,094,416 A | 7/2000 | Ying |
| 6,125,369 A | 9/2000 | Wu |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,173,291 B1 | 1/2001 | Jenevein |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,311,252 B1 | 10/2001 | Raz |
| 6,324,544 B1 | 11/2001 | Alam |
| 6,324,581 B1 | 11/2001 | Xu et al. |
| 6,328,766 B1 | 12/2001 | Long |
| 6,330,570 B1 | 12/2001 | Crighton et al. |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,356,915 B1 | 3/2002 | Chtchetkine |
| 6,363,400 B1 | 3/2002 | Chtchetkine |
| 6,389,432 B1 | 5/2002 | Pothapragada et al. |
| 6,418,478 B1 | 7/2002 | Ignatius |
| 6,421,711 B1 | 7/2002 | Blumenau et al. |
| 6,477,544 B1 | 11/2002 | Bolosky et al. |
| 6,487,561 B1 | 11/2002 | Ofek et al. |
| 6,513,051 B1 | 1/2003 | Bolosky |
| 6,519,679 B2 | 2/2003 | Devireddy et al. |
| 6,538,669 B1 | 3/2003 | Lagueux, Jr. et al. |
| 6,564,228 B1 | 5/2003 | O'Connor |
| 6,609,157 B2 | 8/2003 | Deo |
| 6,609,183 B2 | 8/2003 | Ohran |
| 6,609,187 B1 | 8/2003 | Merrell |
| 6,658,526 B2 | 12/2003 | Nguyen et al. |
| 6,675,177 B1 | 1/2004 | Webb |
| 6,704,730 B2 | 3/2004 | Moulton |
| 6,708,195 B1 | 3/2004 | Borman |
| 6,745,304 B2 | 6/2004 | Playe |
| 6,757,699 B2 | 6/2004 | Lowry |
| 6,757,794 B2 | 6/2004 | Cabrera |
| 6,795,903 B2 | 9/2004 | Schultz |
| 6,810,398 B2 | 10/2004 | Moulton |
| 6,839,819 B2 | 1/2005 | Martin |
| 6,862,674 B2 | 3/2005 | Dice |
| 6,865,655 B1 | 3/2005 | Andersen |
| 6,868,417 B2 | 3/2005 | Kazar |
| 6,889,297 B2 | 5/2005 | Krapp et al. |
| 6,901,493 B1 | 5/2005 | Maffezzoni |
| 6,912,645 B2 | 6/2005 | Dorward |
| 6,928,459 B1 | 8/2005 | Sawdon |
| 6,952,758 B2 | 10/2005 | Chron |
| 6,959,368 B1 | 10/2005 | St. Pierre |
| 6,973,553 B1 | 12/2005 | Archibald et al. |
| 6,976,039 B2 | 12/2005 | Chefalas |
| 6,993,162 B2 | 1/2006 | Stephany et al. |
| 7,017,113 B2 | 3/2006 | Bourbakis |
| 7,035,876 B2 | 4/2006 | Kawai et al. |
| 7,035,880 B1 | 4/2006 | Crescenti |
| 7,035,943 B2 | 4/2006 | Yamane |
| 7,085,904 B2 | 8/2006 | Mizuno |
| 7,089,383 B2 | 8/2006 | Ji |
| 7,089,395 B2 | 8/2006 | Jacobson |

(56) References Cited

U.S. PATENT DOCUMENTS

| | | |
|---|---|---|
| 7,092,956 B2 | 8/2006 | Ruediger |
| 7,103,740 B1 | 9/2006 | Colgrove et al. |
| 7,107,418 B2 | 9/2006 | Ohran |
| 7,111,173 B1 | 9/2006 | Scheidt |
| 7,117,246 B2 | 10/2006 | Christenson |
| 7,139,808 B2 | 11/2006 | Anderson et al. |
| 7,143,091 B2 | 11/2006 | Charnock |
| 7,143,108 B1 | 11/2006 | George |
| 7,191,290 B1 | 3/2007 | Ackaouy |
| 7,200,604 B2 | 4/2007 | Forman |
| 7,200,621 B2 | 4/2007 | Beck et al. |
| 7,246,272 B2 | 7/2007 | Cabezas |
| 7,272,606 B2 | 9/2007 | Borthakur |
| 7,287,252 B2 | 10/2007 | Bussiere |
| 7,290,102 B2 | 10/2007 | Lubbers et al. |
| 7,310,655 B2 | 12/2007 | Dussud |
| 7,320,059 B1 | 1/2008 | Armangau |
| 7,325,110 B2 | 1/2008 | Kubo |
| 7,330,997 B1 | 2/2008 | Odom |
| 7,343,459 B2 | 3/2008 | Prahlad |
| 7,370,003 B2 | 5/2008 | Pych |
| 7,376,805 B2 | 5/2008 | Stroberger et al. |
| 7,383,304 B2 | 6/2008 | Shimada et al. |
| 7,383,462 B2 | 6/2008 | Osaki |
| 7,389,345 B1 | 6/2008 | Adams |
| 7,395,282 B1 | 7/2008 | Crescenti |
| 7,403,942 B1 | 7/2008 | Bayliss |
| 7,409,522 B1 | 8/2008 | Fair et al. |
| 7,444,382 B2 | 10/2008 | Malik |
| 7,444,387 B2 | 10/2008 | Douceur |
| 7,451,166 B2 | 11/2008 | Damani et al. |
| 7,478,096 B2 | 1/2009 | Margolus et al. |
| 7,478,113 B1 | 1/2009 | De Spiegeleer |
| 7,480,782 B2 | 1/2009 | Garthwaite |
| 7,487,245 B2 | 2/2009 | Douceur |
| 7,490,207 B2 | 2/2009 | Amarendran |
| 7,493,314 B2 | 2/2009 | Huang |
| 7,493,456 B2 | 2/2009 | Brittain et al. |
| 7,496,604 B2 | 2/2009 | Sutton |
| 7,512,745 B2 | 3/2009 | Gschwind et al. |
| 7,516,208 B1 | 4/2009 | Kerrison |
| 7,519,635 B1 | 4/2009 | Haustein et al. |
| 7,519,726 B2 | 4/2009 | Pallyill |
| 7,533,331 B2 | 5/2009 | Brown et al. |
| 7,536,440 B2 | 5/2009 | Budd et al. |
| 7,568,080 B2 | 7/2009 | Prahlad |
| 7,577,687 B2 | 8/2009 | Bank et al. |
| 7,590,639 B1 | 9/2009 | Ivanova |
| 7,603,529 B1 | 10/2009 | MacHardy et al. |
| 7,613,748 B2 | 11/2009 | Brockway |
| 7,617,297 B2 | 11/2009 | Bruce |
| 7,631,120 B2 | 12/2009 | Darcy |
| 7,631,194 B2 | 12/2009 | Wahlert |
| 7,636,824 B1 | 12/2009 | Tormasov |
| 7,647,462 B2 | 1/2010 | Wolfgang |
| 7,657,550 B2 | 2/2010 | Prahlad |
| 7,661,028 B2 | 2/2010 | Erofeev |
| 7,668,884 B2 | 2/2010 | Prahlad |
| 7,672,779 B2 | 3/2010 | Fuchs |
| 7,672,981 B1 | 3/2010 | Faibish et al. |
| 7,673,089 B2 | 3/2010 | Hinchey |
| 7,676,590 B2 | 3/2010 | Silverman |
| 7,685,126 B2 | 3/2010 | Patel |
| 7,685,177 B1 | 3/2010 | Hagerstrom |
| 7,685,384 B2 | 3/2010 | Shavit |
| 7,685,459 B1 | 3/2010 | De Spiegeleer |
| 7,698,699 B2 | 4/2010 | Rogers |
| 7,716,445 B2 | 5/2010 | Bonwick |
| 7,721,292 B2 | 5/2010 | Frasier et al. |
| 7,734,581 B2 | 6/2010 | Gu et al. |
| 7,747,579 B2 | 6/2010 | Prahlad |
| 7,747,584 B1 | 6/2010 | Jernigan, IV |
| 7,747,659 B2 | 6/2010 | Bacon et al. |
| 7,778,979 B2 | 8/2010 | Hatonen et al. |
| 7,786,881 B2 | 8/2010 | Burchard et al. |
| 7,788,230 B2 | 8/2010 | Dile |
| 7,814,142 B2 | 10/2010 | Mamou |
| 7,818,287 B2 | 10/2010 | Torii |
| 7,818,495 B2 | 10/2010 | Tanaka et al. |
| 7,818,531 B2 | 10/2010 | Barrall |
| 7,830,889 B1 | 11/2010 | Lemaire |
| 7,831,707 B2 | 11/2010 | Bardsley |
| 7,831,793 B2 | 11/2010 | Chakravarty et al. |
| 7,831,795 B2 | 11/2010 | Prahlad |
| 7,836,161 B2 | 11/2010 | Scheid |
| 7,840,537 B2 | 11/2010 | Gokhale |
| 7,853,750 B2 | 12/2010 | Stager et al. |
| 7,856,414 B2 | 12/2010 | Zee |
| 7,865,470 B2 | 1/2011 | Fries |
| 7,865,678 B2 | 1/2011 | Arakawa |
| 7,870,105 B2 | 1/2011 | Arakawa |
| 7,870,486 B2 | 1/2011 | Wang |
| 7,873,599 B2 | 1/2011 | Ishii |
| 7,873,806 B2 | 1/2011 | Prahlad |
| 7,882,077 B2 | 2/2011 | Gokhale |
| 7,899,990 B2 | 3/2011 | Moll et al. |
| 7,921,077 B2 | 4/2011 | Ting et al. |
| 7,937,371 B2 | 5/2011 | Bates et al. |
| 7,953,706 B2 | 5/2011 | Prahlad |
| 7,962,452 B2 | 6/2011 | Anglin |
| 8,028,106 B2 | 9/2011 | Bondurant et al. |
| 8,037,028 B2 | 10/2011 | Prahlad |
| 8,041,907 B1 | 10/2011 | Wu et al. |
| 8,051,367 B2 | 11/2011 | Arai et al. |
| 8,054,765 B2 | 11/2011 | Passey et al. |
| 8,055,618 B2 | 11/2011 | Anglin |
| 8,055,627 B2 | 11/2011 | Prahlad |
| 8,055,745 B2 | 11/2011 | Atluri |
| 8,078,603 B1 | 12/2011 | Chandratillake |
| 8,086,799 B2 | 12/2011 | Mondal et al. |
| 8,095,756 B1 | 1/2012 | Somavarapu |
| 8,108,429 B2 | 1/2012 | Sim-Tang |
| 8,112,357 B2 | 2/2012 | Mueller |
| 8,131,687 B2 | 3/2012 | Bates et al. |
| 8,140,786 B2 | 3/2012 | Bunte |
| 8,156,092 B2 | 4/2012 | Hewett |
| 8,156,279 B2 | 4/2012 | Tanaka et al. |
| 8,161,003 B2 | 4/2012 | Kavuri |
| 8,161,255 B2 | 4/2012 | Anglin et al. |
| 8,165,221 B2 | 4/2012 | Zheng |
| 8,166,263 B2 | 4/2012 | Prahlad |
| 8,170,994 B2 | 5/2012 | Tsaur |
| 8,190,823 B2 | 5/2012 | Waltermann et al. |
| 8,190,835 B1 | 5/2012 | Yueh |
| 8,213,540 B1 | 7/2012 | Rickey |
| 8,219,524 B2 | 7/2012 | Gokhale |
| 8,234,444 B2 | 7/2012 | Bates et al. |
| 8,239,348 B1 | 8/2012 | Bezbaruah |
| 8,244,914 B1 | 8/2012 | Nagarkar |
| 8,271,992 B2 | 9/2012 | Chatley |
| 8,285,683 B2 | 10/2012 | Gokhale |
| 8,290,915 B2 | 10/2012 | Anglin |
| 8,295,875 B2 | 10/2012 | Masuda |
| 8,296,260 B2 | 10/2012 | Ting et al. |
| 8,315,984 B2 | 11/2012 | Frandzel |
| 8,346,730 B2 | 1/2013 | Srinivasan |
| 8,364,652 B2 | 1/2013 | Vijayan |
| 8,375,008 B1 | 2/2013 | Gomes |
| 8,380,957 B2 | 2/2013 | Prahlad |
| 8,386,436 B2 | 2/2013 | Ben-Dyke |
| 8,392,677 B2 | 3/2013 | Bunte et al. |
| 8,401,996 B2 | 3/2013 | Muller |
| 8,412,677 B2 | 4/2013 | Klose |
| 8,412,682 B2 | 4/2013 | Zheng et al. |
| 8,484,162 B2 | 7/2013 | Prahlad |
| 8,495,032 B2 | 7/2013 | Anglin et al. |
| 8,548,953 B2 | 10/2013 | Wong |
| 8,572,340 B2 | 10/2013 | Vijayan |
| 8,577,851 B2 | 11/2013 | Vijayan |
| 8,578,109 B2 | 11/2013 | Vijayan |
| 8,578,120 B2 | 11/2013 | Attard |
| 8,620,845 B2 | 12/2013 | Stoakes et al. |
| 8,626,723 B2 | 1/2014 | Ben-Shaul |
| 8,712,969 B2 | 4/2014 | Prahlad |

(56) References Cited

U.S. PATENT DOCUMENTS

| | | |
|---|---|---|
| 8,712,974 B2 | 4/2014 | Datuashvili |
| 8,725,687 B2 | 5/2014 | Klose |
| 8,769,185 B2 | 7/2014 | Chung |
| 8,782,368 B2 | 7/2014 | Lillibridge et al. |
| 8,788,466 B2 | 7/2014 | Anglin et al. |
| 8,880,797 B2 | 11/2014 | Yueh |
| 8,909,881 B2 | 12/2014 | Bunte et al. |
| 8,930,306 B1 | 1/2015 | Ngo |
| 8,935,492 B2 | 1/2015 | Gokhale |
| 8,954,446 B2 | 2/2015 | Vijayan |
| 8,965,852 B2 | 2/2015 | Jayaraman |
| 8,997,020 B2 | 3/2015 | Chambers et al. |
| 9,015,181 B2 | 4/2015 | Kottomtharayil et al. |
| 9,020,890 B2 | 4/2015 | Kottomtharayil et al. |
| 9,020,900 B2 | 4/2015 | Vijayan |
| 9,116,850 B2 | 4/2015 | Vijayan |
| 9,058,117 B2 | 6/2015 | Attarde et al. |
| 9,104,623 B2 | 8/2015 | Vijayan |
| 9,213,540 B1 | 12/2015 | Rickey et al. |
| 9,218,374 B2 | 12/2015 | Muller |
| 9,218,375 B2 | 12/2015 | Muller |
| 9,218,376 B2 | 12/2015 | Muller |
| 9,236,079 B2 | 1/2016 | Prahlad et al. |
| 9,251,186 B2 | 2/2016 | Muller |
| 9,262,275 B2 | 2/2016 | Gokhale |
| 9,276,871 B1 | 3/2016 | Freitas |
| 9,372,479 B1 | 6/2016 | Phillips |
| 9,575,673 B2 | 2/2017 | Mitkar |
| 9,633,022 B2 | 4/2017 | Vijayan et al. |
| 9,633,033 B2 | 4/2017 | Vijayan |
| 9,633,056 B2 | 4/2017 | Attarde |
| 9,639,563 B2 | 5/2017 | Gokhale |
| 9,646,166 B2 | 5/2017 | Cash |
| 9,665,591 B2 | 5/2017 | Vijayan |
| 9,773,025 B2 | 9/2017 | Muller et al. |
| 9,781,000 B1 | 10/2017 | Kumar |
| 10,089,337 B2 | 10/2018 | Senthilnathan et al. |
| 10,262,003 B2 | 4/2019 | Kottomtharayil et al. |
| 10,324,897 B2 | 6/2019 | Amarendran et al. |
| 10,324,914 B2 | 6/2019 | Senthilnathan et al. |
| 10,339,106 B2 | 7/2019 | Vijayan |
| 10,956,274 B2 | 3/2021 | Attarde et al. |
| 2001/0037323 A1 | 11/2001 | Moulton et al. |
| 2002/0055972 A1 | 5/2002 | Weinman |
| 2002/0059317 A1 | 5/2002 | Black et al. |
| 2002/0065892 A1 | 5/2002 | Malik |
| 2002/0099806 A1 | 7/2002 | Balsamo |
| 2002/0107877 A1 | 8/2002 | Whiting |
| 2002/0169934 A1 | 11/2002 | Krapp et al. |
| 2003/0004922 A1 | 1/2003 | Schmidt et al. |
| 2003/0033308 A1 | 2/2003 | Patel et al. |
| 2003/0074600 A1 | 4/2003 | Tamatsu |
| 2003/0097359 A1 | 5/2003 | Ruediger |
| 2003/0110190 A1 | 6/2003 | Achiwa |
| 2003/0135480 A1 | 7/2003 | Van Arsdale |
| 2003/0167318 A1 | 9/2003 | Robbin |
| 2003/0172368 A1 | 9/2003 | Alumbaugh et al. |
| 2003/0177149 A1 | 9/2003 | Coombs |
| 2003/0236763 A1 | 12/2003 | Kilduff |
| 2004/0093259 A1 | 5/2004 | Pych |
| 2004/0128287 A1 | 7/2004 | Keller |
| 2004/0148306 A1 | 7/2004 | Moulton |
| 2004/0177319 A1 | 9/2004 | Horn |
| 2004/0187075 A1 | 9/2004 | Maxham et al. |
| 2004/0220975 A1 | 11/2004 | Carpentier |
| 2004/0230817 A1 | 11/2004 | Ma |
| 2004/0250033 A1 | 12/2004 | Prahlad et al. |
| 2005/0033756 A1 | 2/2005 | Kottomtharayil |
| 2005/0055359 A1 | 3/2005 | Kawai et al. |
| 2005/0060643 A1 | 3/2005 | Glass et al. |
| 2005/0066190 A1 | 3/2005 | Martin |
| 2005/0097150 A1 | 5/2005 | McKeon et al. |
| 2005/0108435 A1 | 5/2005 | Nowacki et al. |
| 2005/0131961 A1 | 6/2005 | Margolus |
| 2005/0138081 A1 | 6/2005 | Alshab et al. |
| 2005/0138483 A1 | 6/2005 | Hatonen et al. |
| 2005/0149589 A1 | 7/2005 | Bacon et al. |
| 2005/0160243 A1 | 7/2005 | Lubbers et al. |
| 2005/0177603 A1 | 8/2005 | Shavit |
| 2005/0182780 A1 | 8/2005 | Forman et al. |
| 2005/0195660 A1 | 9/2005 | Kavuri |
| 2005/0203864 A1 | 9/2005 | Schmidt |
| 2005/0203887 A1 | 9/2005 | Joshi |
| 2005/0210460 A1 | 9/2005 | Rogers |
| 2005/0223109 A1 | 10/2005 | Mamou et al. |
| 2005/0234823 A1 | 10/2005 | Schimpf |
| 2005/0246389 A1 | 11/2005 | Shah et al. |
| 2005/0254072 A1 | 11/2005 | Hirai |
| 2005/0262110 A1 | 11/2005 | Gu et al. |
| 2005/0262193 A1 | 11/2005 | Mamou et al. |
| 2005/0283461 A1 | 12/2005 | Sell |
| 2005/0286466 A1 | 12/2005 | Tagg et al. |
| 2006/0005048 A1 | 1/2006 | Osaki et al. |
| 2006/0053305 A1 | 1/2006 | Wahlert et al. |
| 2006/0010227 A1 | 3/2006 | Atluri |
| 2006/0047894 A1 | 3/2006 | Okumura |
| 2006/0047978 A1 | 3/2006 | Kawakami |
| 2006/0047998 A1 | 3/2006 | Darcy |
| 2006/0056623 A1 | 3/2006 | Gligor |
| 2006/0069702 A1 | 3/2006 | Moeller et al. |
| 2006/0089954 A1 | 4/2006 | Anschutz |
| 2006/0095470 A1 | 5/2006 | Cochran |
| 2006/0123313 A1 | 6/2006 | Brown et al. |
| 2006/0126615 A1 | 6/2006 | Angtin |
| 2006/0129576 A1 | 6/2006 | Carpentier |
| 2006/0129771 A1 | 6/2006 | Dasgupta |
| 2006/0129875 A1 | 6/2006 | Barrall |
| 2006/0174112 A1 | 8/2006 | Wray |
| 2006/0206547 A1 | 9/2006 | Kulkarni |
| 2006/0206621 A1 | 9/2006 | Toebes |
| 2006/0222163 A1 | 10/2006 | Bank et al. |
| 2006/0224846 A1 | 10/2006 | Amarendran |
| 2006/0230081 A1 | 10/2006 | Craswell |
| 2006/0230244 A1 | 10/2006 | Amarendran et al. |
| 2006/0259587 A1 | 11/2006 | Ackerman |
| 2006/0271622 A1 | 11/2006 | Scheid |
| 2007/0022145 A1 | 1/2007 | Kavuri |
| 2007/0067399 A1 | 3/2007 | Kulkarni |
| 2007/0079170 A1 | 4/2007 | Zimmer |
| 2007/0106863 A1 | 5/2007 | Bonwick |
| 2007/0118573 A1 | 5/2007 | Gadiraju et al. |
| 2007/0118705 A1 | 5/2007 | Arakawa et al. |
| 2007/0136200 A1 | 6/2007 | Frank |
| 2007/0156998 A1 | 7/2007 | Gorobets |
| 2007/0179995 A1 | 8/2007 | Prahlad |
| 2007/0198613 A1 | 8/2007 | Prahlad et al. |
| 2007/0203937 A1 | 8/2007 | Prahlad et al. |
| 2007/0255758 A1 | 11/2007 | Zheng et al. |
| 2007/0255909 A1 | 11/2007 | Gschwind et al. |
| 2007/0260476 A1 | 11/2007 | Smolen |
| 2007/0271316 A1 | 11/2007 | Hollebeek |
| 2007/0288534 A1 | 12/2007 | Zak |
| 2008/0005141 A1 | 1/2008 | Zheng et al. |
| 2008/0005201 A1 | 1/2008 | Ting et al. |
| 2008/0028007 A1 | 1/2008 | Ishii et al. |
| 2008/0034045 A1 | 2/2008 | Bardsley |
| 2008/0047935 A1 | 2/2008 | Hinchey |
| 2008/0082714 A1 | 4/2008 | Hinchey |
| 2008/0082736 A1 | 4/2008 | Chow et al. |
| 2008/0091881 A1 | 4/2008 | Brittain et al. |
| 2008/0098083 A1 | 4/2008 | Shergill |
| 2008/0098236 A1 | 4/2008 | Pandey et al. |
| 2008/0104291 A1 | 5/2008 | Hinchey |
| 2008/0115176 A1 | 5/2008 | Rodriguez |
| 2008/0125170 A1 | 5/2008 | Masuda |
| 2008/0126543 A1 | 5/2008 | Hamada |
| 2008/0144079 A1 | 6/2008 | Pandey et al. |
| 2008/0162320 A1 | 7/2008 | Mueller et al. |
| 2008/0162467 A1 | 7/2008 | Fuchs |
| 2008/0162518 A1 | 7/2008 | Bollinger |
| 2008/0162597 A1 | 7/2008 | Tysowski |
| 2008/0184001 A1 | 7/2008 | Stager |
| 2008/0229037 A1 | 9/2008 | Bunte |
| 2008/0243769 A1 | 10/2008 | Arbour |

(56) References Cited

U.S. PATENT DOCUMENTS

| | | |
|---|---|---|
| 2008/0243879 A1 | 10/2008 | Gokhale et al. |
| 2008/0243914 A1 | 10/2008 | Prahlad |
| 2008/0243957 A1 | 10/2008 | Prahlad et al. |
| 2008/0243958 A1 | 10/2008 | Prahlad et al. |
| 2008/0244172 A1 | 10/2008 | Kano |
| 2008/0244204 A1 | 10/2008 | Cremelie et al. |
| 2008/0307000 A1 | 12/2008 | Paterson |
| 2009/0012984 A1 | 1/2009 | Ravid et al. |
| 2009/0049260 A1 | 2/2009 | Upadhyayula |
| 2009/0063528 A1 | 3/2009 | Yueh |
| 2009/0083341 A1 | 3/2009 | Parees |
| 2009/0083344 A1 | 3/2009 | Inoue et al. |
| 2009/0089483 A1 | 4/2009 | Tanaka et al. |
| 2009/0106369 A1 | 4/2009 | Chen et al. |
| 2009/0106480 A1 | 4/2009 | Chung |
| 2009/0109891 A1 | 4/2009 | Fonseca, Jr. et al. |
| 2009/0112870 A1 | 4/2009 | Ozzie |
| 2009/0119678 A1 | 5/2009 | Shih |
| 2009/0132619 A1 | 5/2009 | Arakawa et al. |
| 2009/0132764 A1 | 5/2009 | Moll et al. |
| 2009/0144285 A1 | 6/2009 | Chatley et al. |
| 2009/0150498 A1 | 6/2009 | Branda et al. |
| 2009/0171888 A1 | 7/2009 | Anglin |
| 2009/0177719 A1 | 7/2009 | Kavuri |
| 2009/0179754 A1 | 7/2009 | Burchard et al. |
| 2009/0192978 A1 | 7/2009 | Hewett et al. |
| 2009/0204636 A1 | 8/2009 | Li et al. |
| 2009/0204649 A1 | 8/2009 | Wona et al. |
| 2009/0204650 A1 | 8/2009 | Wong |
| 2009/0228446 A1 | 9/2009 | Anzai |
| 2009/0234870 A1 | 9/2009 | Bates et al. |
| 2009/0268903 A1 | 10/2009 | Bojinov et al. |
| 2009/0271402 A1 | 10/2009 | Srinivasan et al. |
| 2009/0271454 A1 | 10/2009 | Anglin et al. |
| 2009/0281847 A1 | 11/2009 | Hamilton, II |
| 2009/0319534 A1 | 12/2009 | Gokhale |
| 2009/0319585 A1 | 12/2009 | Gokhale |
| 2009/0327625 A1 | 12/2009 | Jaquette |
| 2010/0005259 A1 | 1/2010 | Prahlad et al. |
| 2010/0036887 A1 | 2/2010 | Anglin et al. |
| 2010/0070478 A1 | 3/2010 | Anglin |
| 2010/0082529 A1 | 4/2010 | Mace et al. |
| 2010/0082558 A1 | 4/2010 | Anglin et al. |
| 2010/0082672 A1 | 4/2010 | Kottomtharayil |
| 2010/0088296 A1 | 4/2010 | Periyagaram |
| 2010/0094817 A1 | 4/2010 | Ben-Shaul et al. |
| 2010/0121825 A1 | 5/2010 | Bates et al. |
| 2010/0138500 A1 | 6/2010 | Consul |
| 2010/0161554 A1 | 6/2010 | Datuashvili et al. |
| 2010/0169287 A1 | 7/2010 | Klose |
| 2010/0174881 A1 | 7/2010 | Anglin et al. |
| 2010/0223441 A1 | 9/2010 | Lillibridge et al. |
| 2010/0250549 A1 | 9/2010 | Muller et al. |
| 2010/0281081 A1 | 11/2010 | Stager |
| 2010/0332401 A1 | 12/2010 | Prahlad |
| 2011/0035357 A1 | 2/2011 | Ting et al. |
| 2011/0125711 A1 | 5/2011 | Meisenheimer |
| 2011/0125720 A1 | 5/2011 | Javaraman |
| 2012/0084524 A1 | 4/2012 | Gokhale et al. |
| 2012/0102286 A1 | 4/2012 | Holt |
| 2012/0150818 A1 | 6/2012 | Vijayan |
| 2012/0159098 A1 | 6/2012 | Cheung |
| 2012/0179656 A1 | 7/2012 | Bunte et al. |
| 2012/0209809 A1 | 8/2012 | Prahlad et al. |
| 2012/0233417 A1 | 9/2012 | Kalach |
| 2012/0271793 A1 | 10/2012 | Gokhale |
| 2012/0303595 A1 | 11/2012 | Liu et al. |
| 2012/0311581 A1 | 12/2012 | Balmin |
| 2013/0006946 A1 | 1/2013 | Prahlad et al. |
| 2013/0013573 A1 | 1/2013 | Anglin |
| 2013/0041872 A1 | 2/2013 | Aizman |
| 2013/0086007 A1 | 4/2013 | Bandopadhyay |
| 2013/0117305 A1 | 5/2013 | Varakin |
| 2013/0179405 A1 | 7/2013 | Bunte et al. |
| 2013/0218350 A1 | 8/2013 | Phillips |
| 2013/0218842 A1 | 8/2013 | Muller et al. |
| 2013/0262386 A1 | 10/2013 | Kottomtharayil et al. |
| 2013/0262801 A1 | 10/2013 | Sancheti |
| 2013/0290598 A1 | 10/2013 | Fiske |
| 2013/0339298 A1 | 12/2013 | Muller |
| 2013/0339310 A1 | 12/2013 | Muller |
| 2014/0006382 A1 | 1/2014 | Barber |
| 2014/0012814 A1 | 1/2014 | Bercovici et al. |
| 2014/0129961 A1 | 5/2014 | Zubarev |
| 2014/0181079 A1 | 6/2014 | Ghazal |
| 2014/0188532 A1 | 7/2014 | Liu |
| 2014/0250088 A1 | 9/2014 | Klose et al. |
| 2014/0310232 A1 | 10/2014 | Plattner |
| 2015/0178277 A1 | 6/2015 | Singhal |
| 2015/0199242 A1 | 7/2015 | Attarde et al. |
| 2015/0205678 A1 | 7/2015 | Kottomtharayil et al. |
| 2015/0205817 A1 | 7/2015 | Kottomtharayil et al. |
| 2015/0212889 A1 | 7/2015 | Amarendran et al. |
| 2016/0124658 A1 | 5/2016 | Prahlad |
| 2016/0179435 A1 | 6/2016 | Haley |
| 2016/0210064 A1 | 7/2016 | Dornemann |
| 2016/0342633 A1 | 11/2016 | Senthilnathan |
| 2016/0342655 A1 | 11/2016 | Senthilnathan |
| 2016/0342661 A1 | 11/2016 | Kumarasamy |
| 2016/0350391 A1 | 12/2016 | Vijayan |
| 2017/0083408 A1 | 3/2017 | Vijayan et al. |
| 2017/0193003 A1 | 7/2017 | Vijayan |
| 2017/0206206 A1 | 7/2017 | Gokhale |
| 2018/0144000 A1 | 5/2018 | Muller |
| 2018/0239772 A1 | 8/2018 | Vijayan et al. |
| 2018/0364914 A1 | 12/2018 | Prahlad |
| 2019/0042609 A1 | 2/2019 | Senthilnathan |
| 2019/0188188 A1 | 6/2019 | Kottomtharayil et al. |
| 2019/0192978 A1 | 6/2019 | Eatedali et al. |
| 2019/0266139 A1 | 8/2019 | Kumarasamy et al. |
| 2019/0278748 A1 | 9/2019 | Amarendran et al. |
| 2020/0167240 A1 | 5/2020 | Haridas et al. |

FOREIGN PATENT DOCUMENTS

| | | |
|---|---|---|
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| WO | WO9513580 | 5/1995 |
| WO | WO9912098 | 3/1999 |
| WO | WO03027891 | 4/2003 |
| WO | WO2006052872 | 5/2006 |
| WO | WO2008070688 | 6/2008 |
| WO | WO2008080140 | 7/2008 |

OTHER PUBLICATIONS

U.S. Appl. No. 16/380,469, filed Apr. 10, 2019, Vijayan.

U.S. Appl. No. 16/407,040, filed May 8, 2019, Ngo.

Anonymous, "NTFS Sparse Files (NTFS5 Only)", Jun. 4, 2002, pp. 1-1, https://web.archive.org/web/20020604013016/http://ntfs.com/ntfs-sparse.htm.

Armstead et al., "Implementation of a Campwide Distributed Mass Storage Service: The Dream vs. Reality," IEEE, Sep. 11-14, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Commvault Systems, Inc., "Continuous Data Replicator 7.0," Product Data Sheet, 2007, 6 pages.

CommVault Systems, Inc., "Deduplication—How To," <http://documentation.commvault.com/commvault/release_8_0_0/books_online_1/english_US/features/single_instance/single_instance_how_to.htm>, earliest known publication date: Jan. 26, 2009, 7 pages.

(56) References Cited

OTHER PUBLICATIONS

CommVault Systems, Inc., "Deduplication," <http://documentation.commvault.com/commvault/release_8_0_0/books_online_1/english_US/features/single_instance/single_instance.htm>, earliest known publication date: Jan. 26, 2009, 9 pages.
Computer Hope, "File," May 21, 2008, pp. 1-3, https://web.archive.org/web/20080513021935/https://www.computerhope.com/jargon/f/file.htm.
Diligent Technologies "HyperFactor," <http://www.diligent.com/products:protecTIER-1:HyperFactor-1>, Internet accessed on Dec. 5, 2008, 2 pages.
Eitel, "Backup and Storage Management in Distributed Heterogeneous Environments," IEEE, Jun. 12-16, 1994, pp. 124-126.
Enterprise Storage Management, "What Is Hierarchical Storage Management?", Jun. 19, 2005, pp. 1, http://web.archive.org/web/20050619000521/hhttp://www.enterprisestoragemanagement.com/faq/hierarchical-storage-management-shtml.
Enterprise Storage Management, What Is A Incremental Backup?, Oct. 26, 2005, pp. 1-2, http://web.archive.org/web/w0051026010908/http://www.enterprisestoragemanagement.com/faq/incremental-backup.shtml.
Extended European Search Report for EP07865192.4; dated May 2, 2013, 7 pages.
Federal Information Processing Standards Publication 180-2, "Secure Hash Standard", Aug. 1, 2002, <http://csrc.nist.gov/publications/fips/fips1 80-2/fips 1 80-2withchangenotice. pdf>, 83 pages.
FlexHex, "NTFS Sparse Files for Programmers", Feb. 22, 2006, pp. 1-4, https://web.archive.org/web/20060222050807/http://www.flexhex.com/docs/articles/sparse-files.phtml.
Gait, J., "The Optical File Cabinet: A Random-Access File System For Write-Once Optical Disks," IEEE Computer, vol. 21, No. 6, pp. 11-22 (Jun. 1988).
Geer, D., "Reducing The Storage Burden Via Data Deduplication," IEEE, Computer Journal, vol. 41, Issue 12, Dec. 2008, pp. 15-17.
Handy, Jim, "The Cache Memory Book: The Authoritative Reference on Cache Design," Second Edition, 1998, pp. 64-67 and pp. 204-205.
International Preliminary Report on Patentability and Written Opinion for PCT/US2007/086421, dated Jun. 18, 2009, 8 pages.
International Preliminary Report on Patentability and Written Opinion for PCT/US2011/054378, dated Apr. 11, 2013, 5 pages.
International Search Report and Written Opinion for PCT/US07/86421, dated Apr. 18, 2008, 9 pages.
International Search Report for Application No. PCT/US09/58137, dated Dec. 23, 2009, 14 pages.
International Search Report for Application No. PCT/US10/34676, dated Nov. 29, 2010, 9 pages.
International Search Report for Application No. PCT/US11/54378, dated May 2, 2012, 8 pages.
Jander, M., "Launching Storage-Area Net," Data Communications, US, McGraw Hill, NY, vol. 27, No. 4 (Mar. 21, 1998), pp. 64-72.
Kornblum, Jesse, "Identifying Almost Identical Files Using Context Triggered Piecewise Hashing," www.sciencedirect.com, Digital Investigation 3S (2006), pp. S91-S97.
Lortu Software Development, "Kondar Technology-Deduplication," <http://www.lortu.com/en/deduplication.asp>, Internet accessed on Dec. 5, 2008, 3 pages.
Menezes et al., "Handbook Of Applied Cryptography", CRC Press, 1996, <http://www.cacr.math.uwaterloo.ca/hac/aboutlchap9.pdf>, 64 pages.
Microsoft, "Computer Dictionary", p. 249, Fifth Edition, 2002, 3 pages.
Microsoft, "Computer Dictionary", pp. 142, 150, 192, and 538, Fifth Edition, 2002, 6 pages.
Microsoft, "Computer Dictionary," Fifth Edition, 2002, p. 220.
Overland Storage, "Data Deduplication," <http://www.overlandstorage.com/topics/data_deduplication.html>, Internet accessed on Dec. 5, 2008, 2 pages.
Quantum Corporation, "Data De-Duplication Background: A Technical White Paper," May 2008, 13 pages.
Rosenblum et al., "The Design and Implementation of a Log-Structured File System," Operating Systems Review SIGOPS, vol. 25, No. 5, New York, US, pp. 1-15 (May 1991).
SearchStorage, "File System", Nov. 1998, <http://searchstorage.techtarget.com/definition/file-system>, 10 pages.
Sharif, A., "Cache Memory," Sep. 2005, http://searchstorage.techtarget.com/definition/cache-memory, pp. 1-26.
Techterms.com, "File," May 17, 2008, 1 page, <https://web.archive.org/web/20080517102848/https://techterms.com/definition/file>.
Webopedia, "Cache," Apr. 11, 2001, http://web.archive.org/web/20010411033304/http://www.webopedia.com/TERM/c/cache.html pp. 1-4.
Webopedia, "Data Duplication", Aug. 31, 2006, <http://web.archive.org/web/20060913030559/http://www.webopedia.com/TERMID/data_deduplication.html>, 2 pages.
Webopedia, "File," May 21, 2008, pp. 1-3, <https://web.archive.org/web/20080521094529/https://www.webopedia.com/TERM/F/file.html>.
Webopedia, "Folder", Aug. 9, 2002, <https://web.archive.org/web/20020809211001/http://www.webopedia.com/TERM/F/folder.html> pp. 1-2.
Webopedia, "Logical Drive", Aug. 13, 2004, pp. 1-2, https://web.archive.org/web/20040813033834/http://www.webopedia.com/TERM/L/logical_drive.html.
Webopedia, "LPAR", Aug. 8, 2002, pp. 1-2, <https://web.archive.org/web/20020808140639/http://www.webopedia.com/TERM/L/LPAR.html.
Webopedia, "Metadata", Apr. 5, 2001, <https://web.archive.org/web/20010405235507/http://www.webopedia.com/TERM/M/metadata.html>, pp. 1-2.
Webopedia, "header", Jul. 21, 2005, pp. 1-2, <https://web.archive.org/web/20080503033941/https://www.webopedia.com/TERM/H/header.html (Year: 2005).
Australian Examination Report dated Feb. 14, 2012 for Australian Application No. 2009296695 in 3 pages.
Australian Examination Report dated Jun. 7, 2013 for Australian Application No. 2009296695 in 3 pages.
Australian Examination Report dated Sep. 12, 2013 for Australian Application No. 2009296695 in 6 pages.
Australian Examination Report dated Oct. 2, 2014 for Australian Application No. 2013206404 in 2 pages.
Canadian Examination Report dated Nov. 7, 2014 for Canadian Application No. 2729078 in 5 pages.
European Examination Report dated Jan. 13, 2020 for European Application No. 09816825.5 in 7 pages.
Partial Supplementary European Search Report dated Apr. 15, 2015 for European Application No. 09816825.5 in 6 pages.
Computer Hope, "File", May 13, 2008, pp. 1-1, https://web.archive.org/web/20080513021935/https://www.computerhope.com/jargon/f/file.htm (Year: 2008).
Techterms.com, "File", May 17, 2008, pp. 1-1, https://web.archive.org/web/20080517102848/https://techterms.com/definition/ file (Year: 2008).
Kulkarni P. et al., "Redundancy elimination within large collections of files," Proceedings of the Usenix Annual Technical Conference, Jul. 2, 2004, pp. 59-72.

Primary 600

| Identifier | Location | Offset | Reference Count |
|---|---|---|---|
| 0xA1B3FG | V_1\Chunk_1\Container File 001 | 10 | 2 |
| 0xFG329A | V_1\Chunk_5\Container File 002 | 6 | 0 |
| 0xC13804 | V_2\Chunk_1\Container File 001 | 38 | 1 |
| ... | | | |

620 → 0xA1B3FG
622 → 0xFG329A
624 → 0xC13804

Secondary 650

| Identifier | Referring Location | Offset |
|---|---|---|
| 0xA1B3FG | V_3\Chunk_1\Metadata file 001 | 5 |
| 0xA1B3FG | V_3\Chunk_8\Metadata file 001 | 15 |
| 0xC13804 | V_3\Chunk_2\Metadata file 001 | 19 |
| ... | | |

BLOCK-LEVEL SINGLE INSTANCING

CROSS REFERENCE TO RELATED APPLICATIONS

This application is a continuation of U.S. patent application Ser. No. 16/228,726, filed on Dec. 20, 2018 (entitled BLOCK-LEVEL SINGLE INSTANCING), which is a continuation of U.S. patent application Ser. No. 14/668,450 filed on Mar. 25, 2015, which is a divisional of U.S. patent application Ser. No. 14/049,463 filed on Oct. 9, 2013 (entitled BLOCK-LEVEL SINGLE INSTANCING), which is a continuation of U.S. patent application Ser. No. 12/647,906 filed on Dec. 28, 2009 (entitled BLOCK-LEVEL SINGLE INSTANCING), now U.S. Pat. No. 8,578,120, which claims the benefit of U.S. Patent Application No. 61/180,791 filed on May 22, 2009 (entitled BLOCK-LEVEL SINGLE INSTANCING), and is related to U.S. patent application Ser. No. 12/565,576 filed on Sep. 23, 2009 (entitled SYSTEMS AND METHODS FOR MANAGING SINGLE INSTANCING DATA), each of which is incorporated by reference in its entirety.

BACKGROUND

Single instancing in a data storage system typically involves attempting to store only a single instance of a file on a storage device. In certain single instancing systems, a separate folder on the file system of the storage device is created for each single instancing storage operation performed. Each file that has been single instanced is stored as a separate individual file in the separate folder.

Because there may be numerous computing systems in the data storage system, each requiring one or more storage operations, these techniques may result in the creation of numerous folders, each containing numerous files. For example, if there are hundreds of computing systems, each having thousands of files, backing up or copying all of these files may potentially result in the creation of millions of files on the storage device.

Certain file systems of storage devices may not be capable of adequately providing for storing such large numbers of files. Other file systems may be equipped to handle storing millions of files or more, but may not perform optimally in such situations.

The need exists for systems and methods that overcome the above problems, as well as that provide additional benefits. Overall, the examples herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

FIGS. 6A and 6B are diagrams illustrating suitable data structures that may be employed by aspects of the invention.

DETAILED DESCRIPTION

Figure 1:
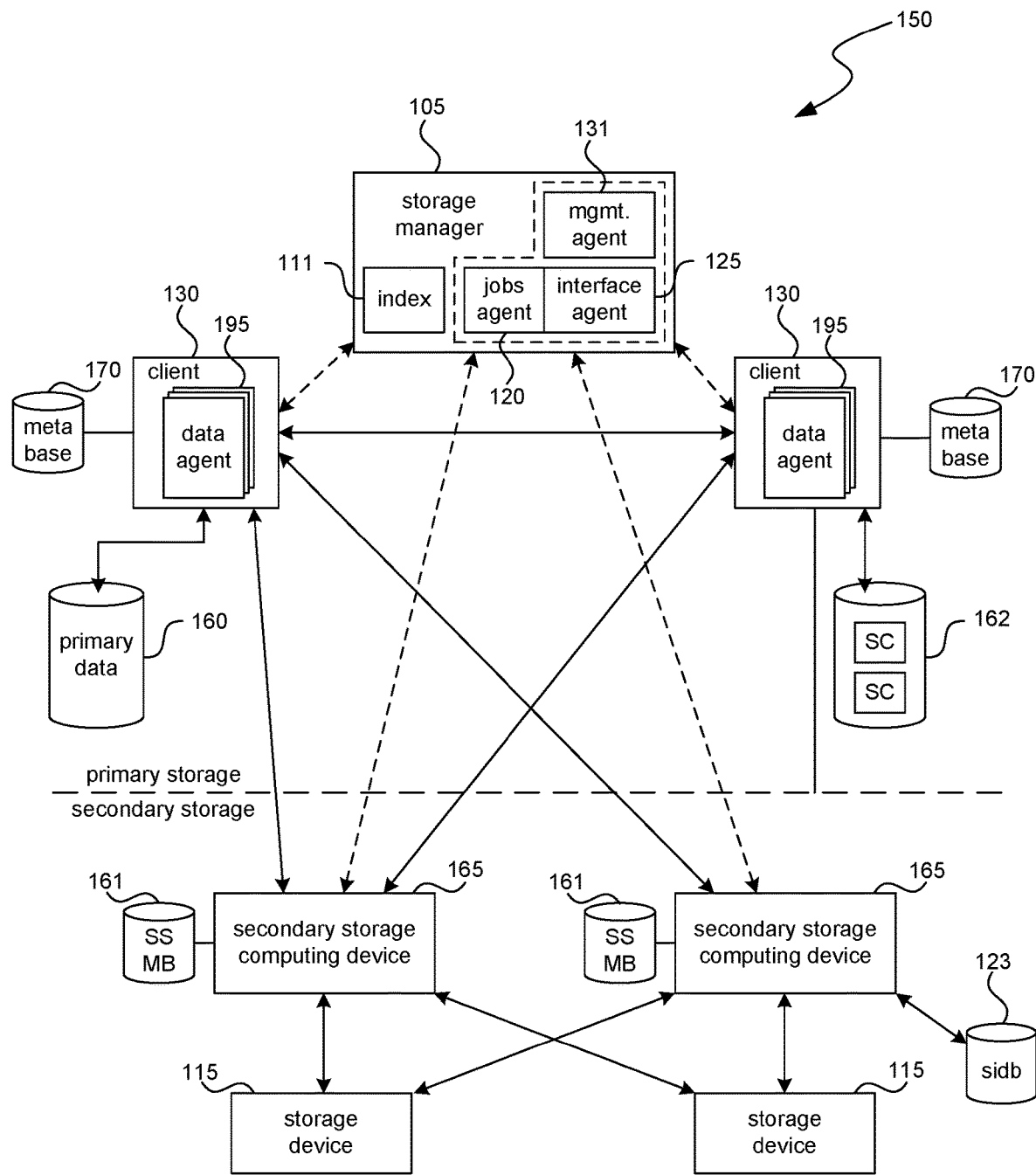
FIG. 1 is a block diagram illustrating an example of a data storage enterprise that may employ aspects of the invention.

The headings provided herein are for convenience only and do not necessarily affect the scope or meaning of the claimed invention.

Overview

This application describes in detail, among other things, systems and methods for single instancing (alternatively called deduplicating) blocks of data in a data storage system (alternatively called a data storage network, a data storage environment, or a data storage enterprise). The data storage system stores single instanced blocks of data (alternatively referred to as deduplicated blocks of data) in one or more files and maintains one or more data structures (e.g., index files) that keep track of which blocks of data are referenced. This allows the data storage system to, among other things: 1) single-instance data at a more granular level (at a block-level instead of at a file-level); 2) reduce or eliminate redundantly stored data, thereby saving storage space; 3) store very large numbers of blocks of data without regard to file system limitations; and 4) delete data that no longer needs to be stored, while still maintaining data that needs to be stored.

The data storage system, for example, may include multiple computing devices or computing systems (e.g., client computing devices) that store primary data (e.g., production data such as system files, user files, etc.). The data storage system may also include a secondary storage computing device, a single instance database, and one or more storage devices that store copies of the primary data (e.g., secondary copies, tertiary copies, etc.). The secondary storage computing device receives blocks of data from the computing devices and accesses the single instance database to determine whether the blocks of data are unique (unique meaning that no instances of the blocks of data are already stored on the storage devices). If a block of data is unique, the single instance database stores it in a file on a storage device. If not, the secondary storage computing device can avoid storing the block of data on the storage devices.

The primary data of the computing devices can be divided into data that is eligible for single instancing and data that is not eligible for single instancing. An example of the latter is metadata (e.g., Master File Table (MFT) information) and an example of the former is data (e.g., operating system and/or application files). A file typically comprises one or more blocks as tracked by the file systems of the computing devices.

The computing devices align data that is eligible for single instancing into blocks of data (which may comprise one or more blocks as tracked by the file systems of the computing devices) and generate identifiers for the blocks of data that the secondary storage computing device uses to determine if the blocks of data are unique. This allows the secondary storage computing device to avoid generating identifiers for the blocks of data, which may be computationally expensive and/or require a long time to perform. Therefore, the distribution of the task of generating identifiers (which can be computationally expensive operations) across numerous computing devices frees up the secondary storage computing device to perform other operations (e.g., storing data, retrieving data, pruning data, etc.).

The computing devices send the blocks of data and other data (e.g., metadata and/or the data that is not eligible for single instancing) in a data stream to the secondary storage computing device. The secondary storage computing device receives the data stream and stores blocks of data and their identifiers in buffers in random access memory (RAM). The secondary storage computing device determines whether a block of data is already stored on a storage device. To do this, the secondary storage computing device determines, by analyzing data structures in the single instance database in view of the block's identifier, whether the block of data is already stored on a storage device. If it is, then the secondary storage computing device 1) stores a link to the already stored block of data in a metadata file and 2) discards the block of data from the memory buffer. If it is not, then the secondary storage computing device stores the block of data in a container file.

Because the size of a block of data and associated metadata is typically less then the size of a memory buffer, the secondary storage computing device can keep a single block of data in a single memory buffer while it looks up its identifier in the single instance database. This allows the secondary storage computing device to avoid writing the block of data to disk (an operation which is typically slower than storing the block of data in a RAM buffer) until the secondary storage computing device determines that it needs to store the block of data in a container file on a storage device. The secondary storage computing device stores data that is not eligible for single instancing in metadata files.

By storing multiple blocks of data in a single container file, the secondary storage computing device avoids storing each block of data as a separate file on the file systems of the storage devices. This reduces the number of files that would be stored on the file systems of the storage devices, thereby ensuring that the storage devices can adequately store the data of the computing devices in the data storage system.

One advantage of these techniques is that they significantly reduce the number of files stored on a file system of a computing device or storage device. This is at least partly due to the storage of data blocks within the container files. Even if the secondary storage computing device performs numerous storage operations, these techniques will result in storing far fewer files on the file system than storage operations where each data block is stored as a separate file. Therefore, the file system of the computing device or storage device may not necessarily have to contend with storing excessively large numbers of files, such as millions of files or more. Accordingly, these techniques enable very large numbers of blocks of data to be stored without regard to limitations of the file system of the computing device or storage device.

However, the storage of blocks of data in container files may create additional complexities when it comes time to prune data. This is because a container file may contain blocks of data that are referenced by links in metadata files and thus cannot be deleted, because referenced blocks of data typically still need to be stored on the storage devices. Furthermore, because the blocks of data are not stored as files on the file systems of the storage devices, they cannot be directly referenced by the file system.

The systems and methods described herein provide solutions to these problems. The secondary storage computing device creates the container files as sparse files (typically only on operating systems that support sparse files, e.g., Windows operating systems, and other operating systems that support sparse files). A sparse file is type of file that may include empty space (e.g., a sparse file may have real data within it, such as at the beginning of the file and/or at the end of the file, but may also have empty space in it that is not storing actual data, such as a contiguous range of bytes all having a value of zero). Second, the secondary storage computing device maintains a separate index that stores an indication of whether blocks of data in container files are referred to by links in metadata files. In some examples, this can be analogized to using another, non-native file system that keeps track of blocks of data in the container files, on top of the existing, native file systems of the storage devices.

When a block of data is not referred to and does not need to be stored, the secondary storage computing device can prune it. To prune data, the secondary storage computing device accesses the separate index to determine the blocks of data that are not referred to by links. On operating systems that support sparse files, the secondary storage computing device can free up space in the container files corresponding to those blocks of data by marking the portions of the physical media corresponding to the unreferenced portions of the container file as available for storage (e.g., by zeroing out the corresponding bytes in the container files). On operating systems that do not support sparse files, the secondary storage computing device can free up space in the container files by truncating the extreme portions of the container files (e.g., the extremities such as the beginnings and/or the ends of the container files), thereby making the corresponding portions of the physical media available to store other data. Freeing up space in container files allows the operating system to utilize the freed-up space in other fashions (e.g., other programs may utilize the freed-up space).

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention may include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Figure 2:
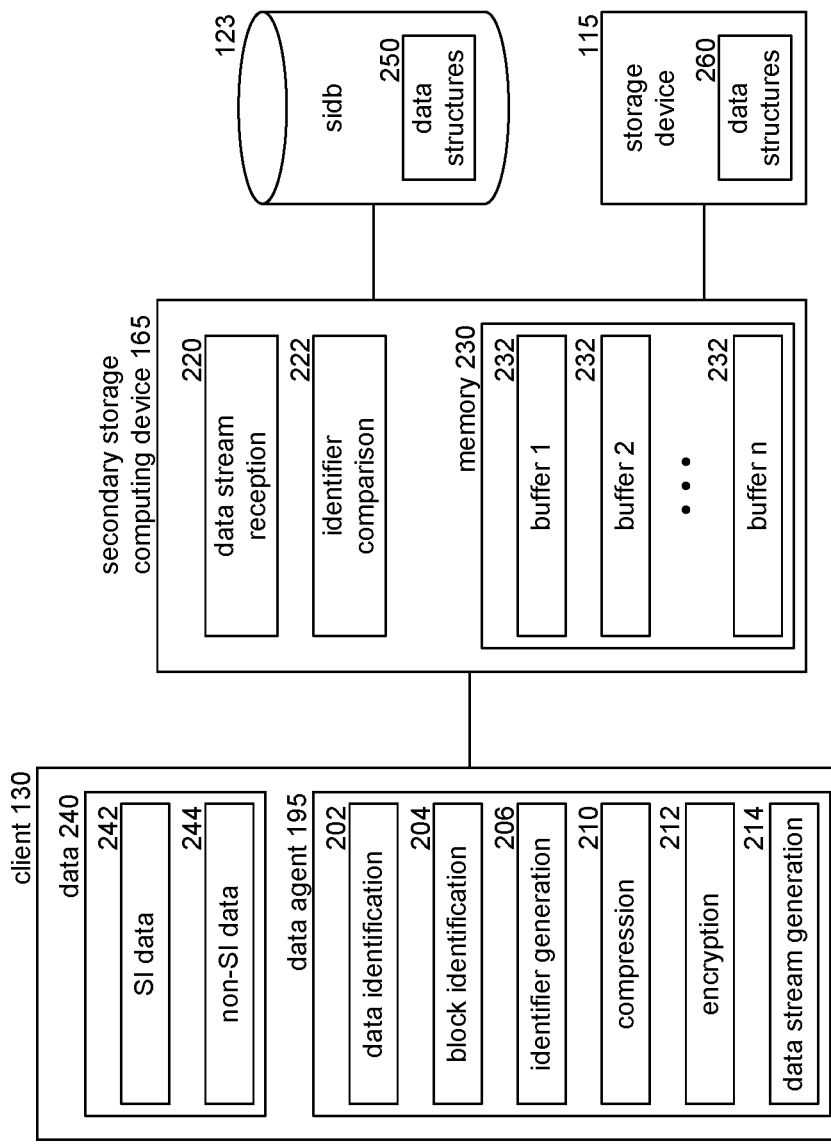
FIG. 2 is a block diagram depicting in more detail certain components illustrated in FIG. 1.

FIGS. 1 and 2 and the discussion herein provide a brief, general description of a suitable specialized environment in which aspects of the invention can be implemented. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular phones, mobile phones, and/or mobile devices, multi-processor systems, microprocessor-based or programmable consumer electronics, set-top boxes, network PCs, mini-computers, mainframe computers, and the like. The terms "computer," "server," "host," "host system," "client,"

and the like are generally used interchangeably herein, and refer to any of the above devices and systems, as well as any data processor.

While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), and/or the Internet. In a distributed computing environment, program modules may be located in both local and remote memory storage devices.

Aspects of the invention may be stored or distributed on computer-readable media, including tangible computer-readable storage media such as magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Aspects of the invention will now be described in detail with respect to FIGS. 1 through 9. FIG. 1 illustrates an example of a data storage system that may employ aspects of the invention. FIG. 2 illustrates in more detail certain components illustrated in FIG. 1 that may be used to implement a block-level single instancing system. These components include a secondary storage computing device, a single instancing database, and a storage device that stores only a single instance of blocks of data of one or more computing devices (e.g., client computing devices).

Figure 3:
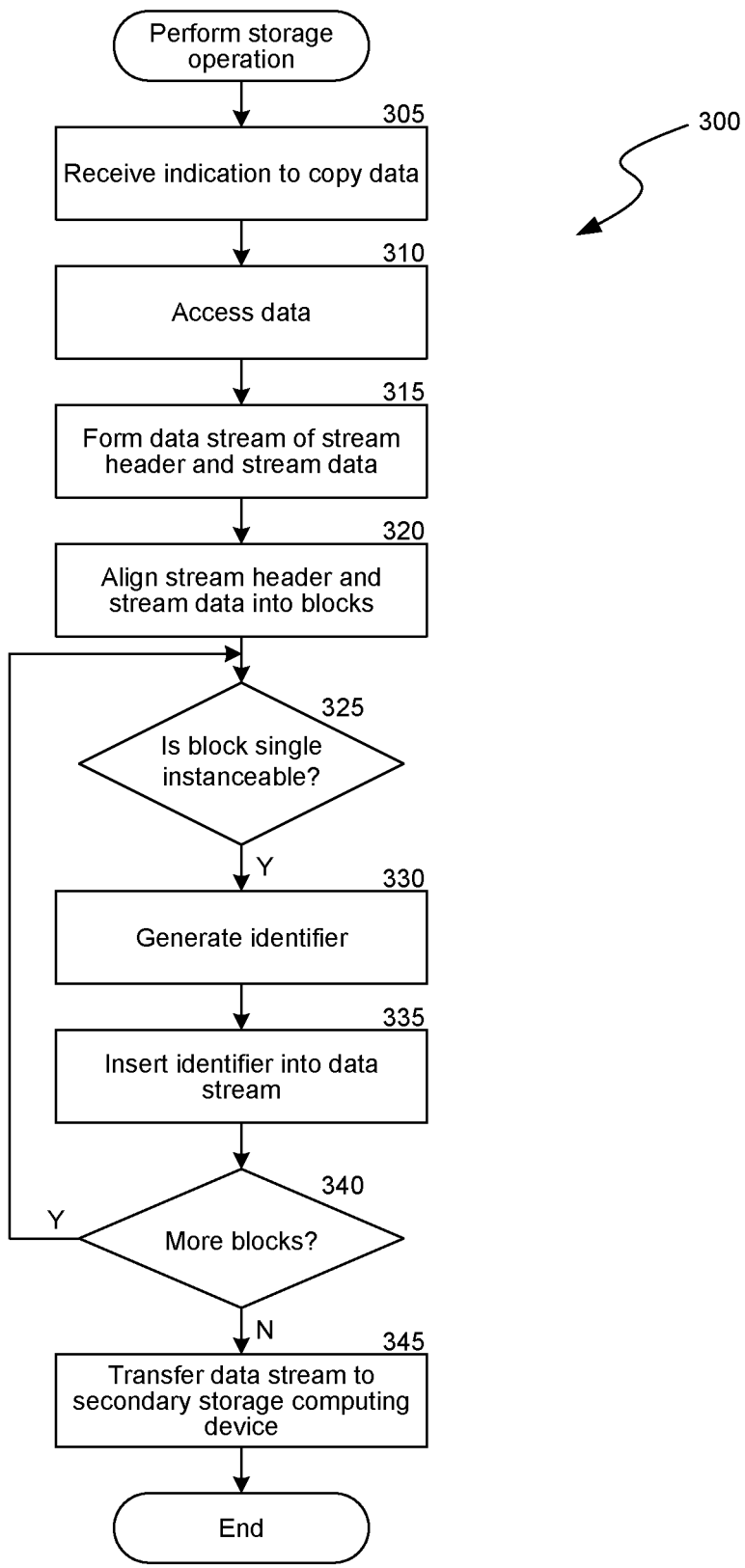
FIG. 3 is a flow diagram of certain aspects of a process for performing a storage operation.
Figure 4:
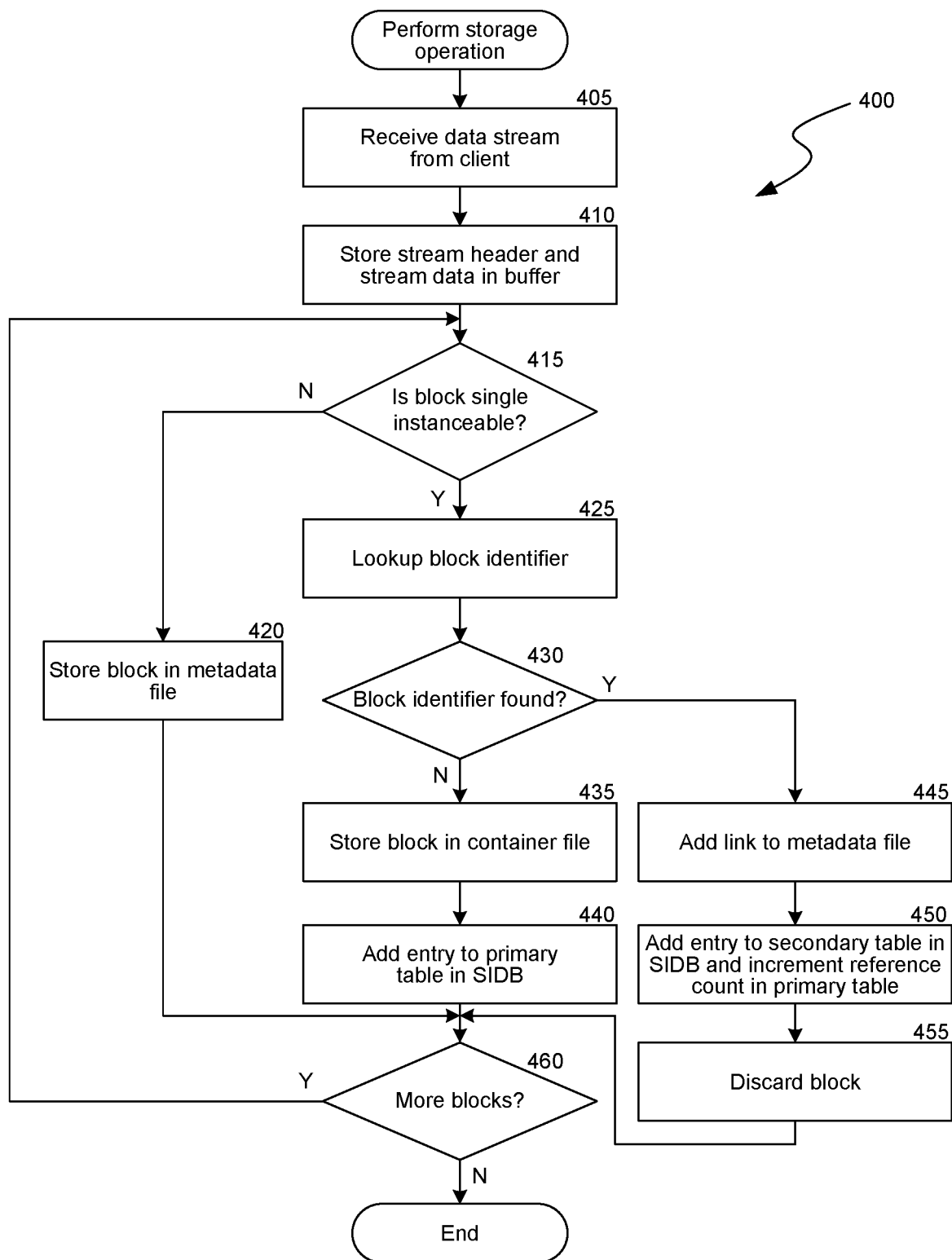
FIG. 4 is a flow diagram of other aspects of a process for performing a storage operation.

FIG. 3 illustrates aspects of a process for copying data that a computing device (e.g., a client computing device) may perform. These aspects include determining whether data is eligible for single instancing and transferring data in a data stream to the secondary storage computing device. FIG. 4 illustrates aspects of the copy process that the secondary storage computing device may perform upon receipt of the data stream from the computing device. During this part of the copy process, the secondary storage computing device determines whether the data of the computing device is single instanceable.

Figure 5A:
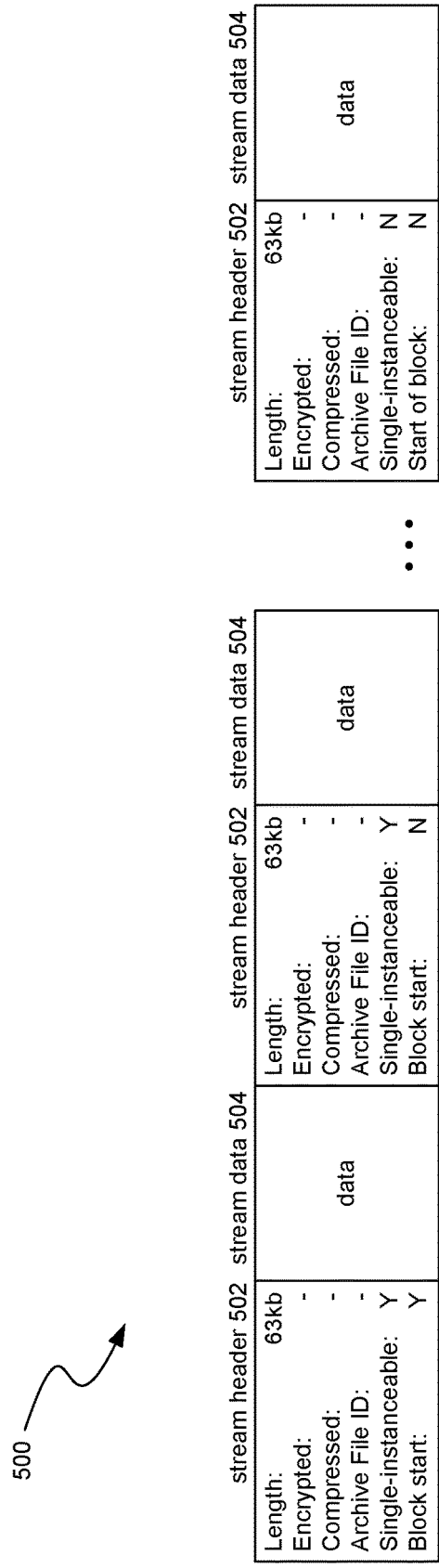
FIGS. 5A and 5B are diagrams illustrating suitable data structures that may be employed by aspects of the invention.
Figure 5B:
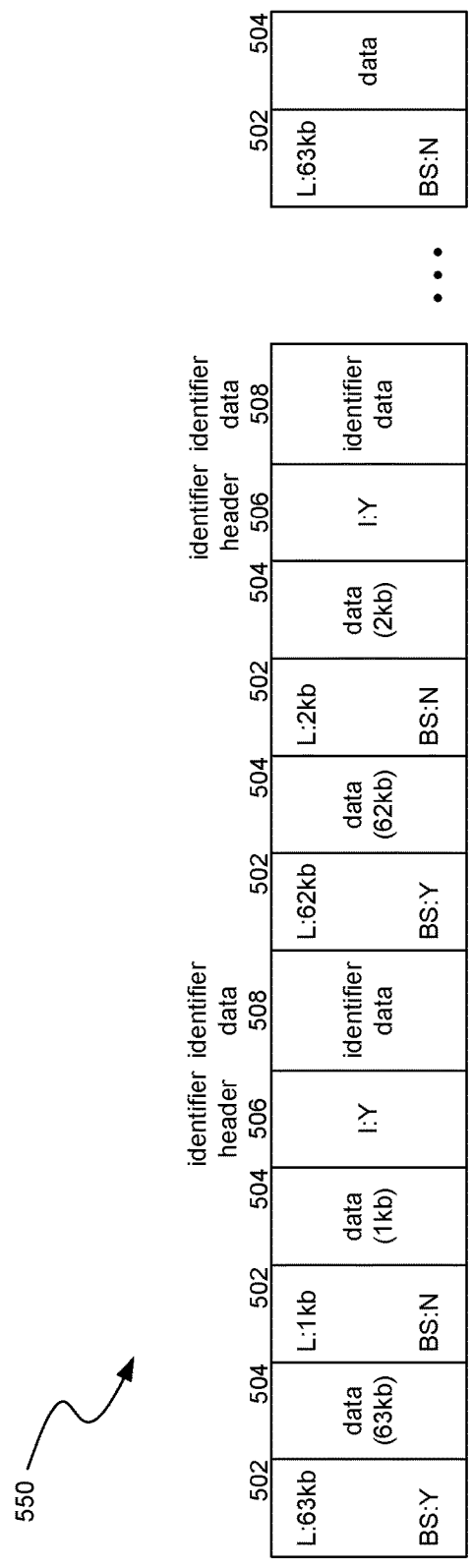
Figure 7:
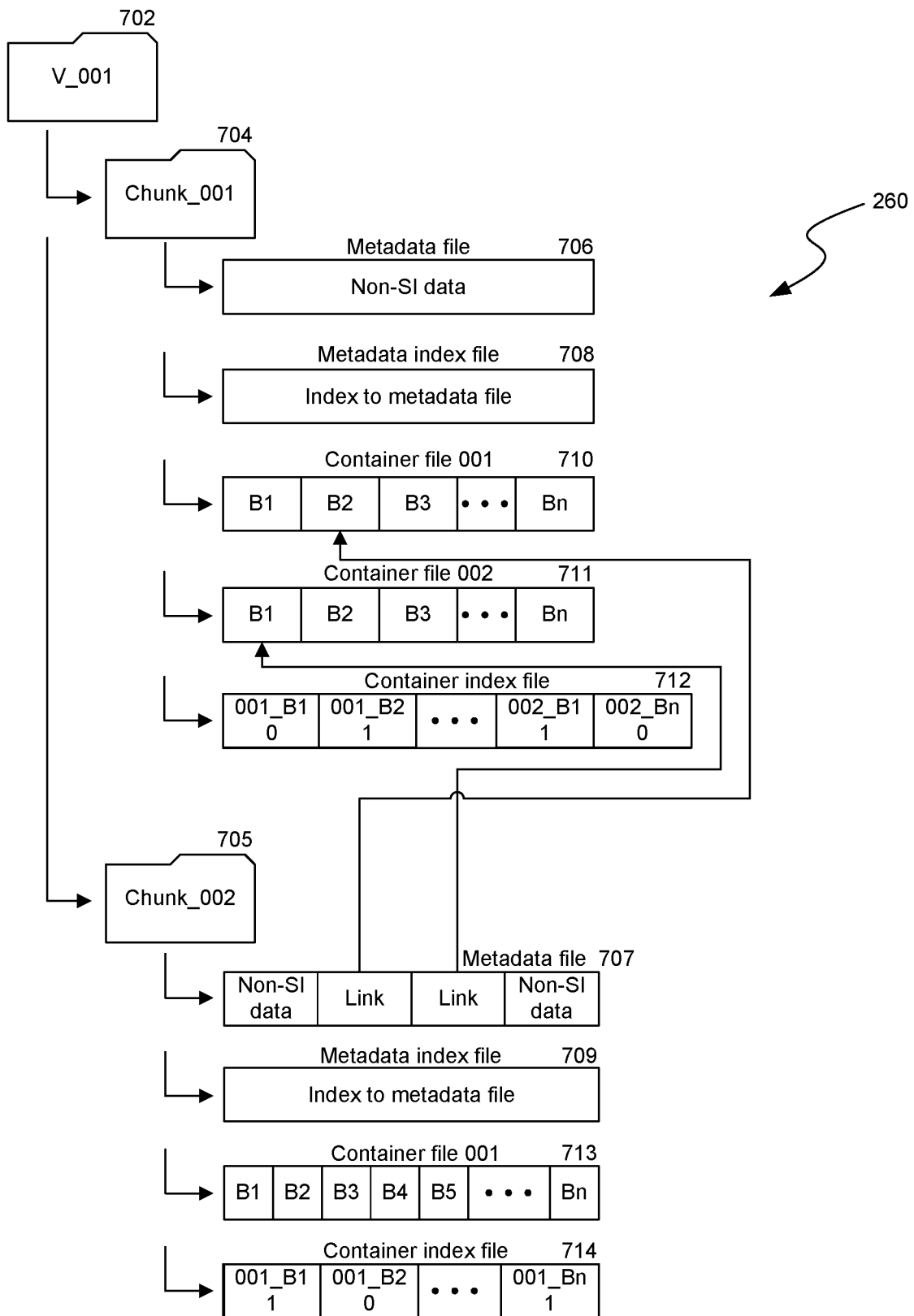
FIG. 7 is a diagram illustrating various data structures that aspects of the invention may utilize.

FIGS. 5A and 5B, 6A and 6B, and 7 are illustrations of various data structures that aspects of the invention may utilize. FIGS. 5A and 5B depict data streams that the computing device may form during the copy process. FIGS. 6A and 6B show data structures that may be used by the single instance database to keep track of where blocks of data and references to blocks of data are stored on the storage device. FIG. 7 illustrates data structures that may be used to store blocks of data on the storage device.

Figure 8:
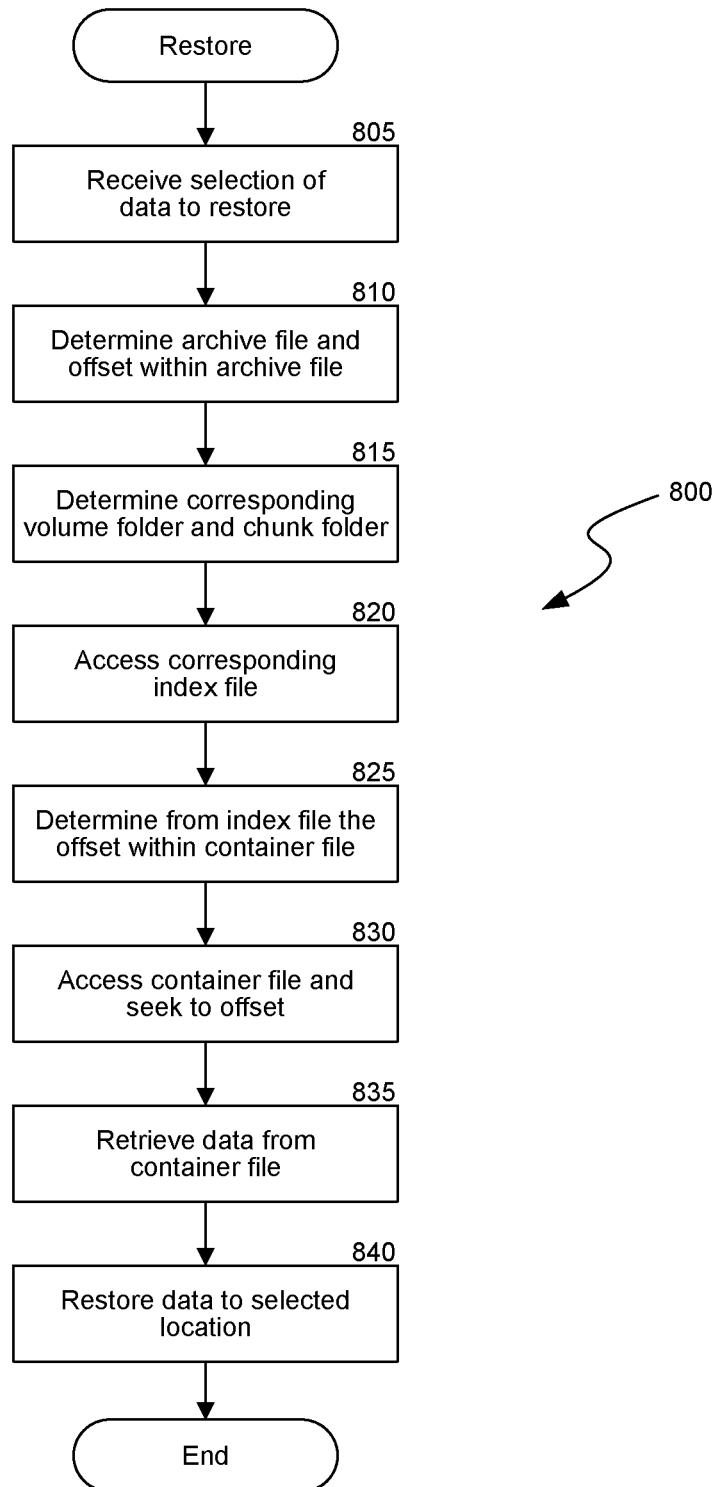
FIG. 8 is a flow diagram of a process for restoring data.
Figure 9:
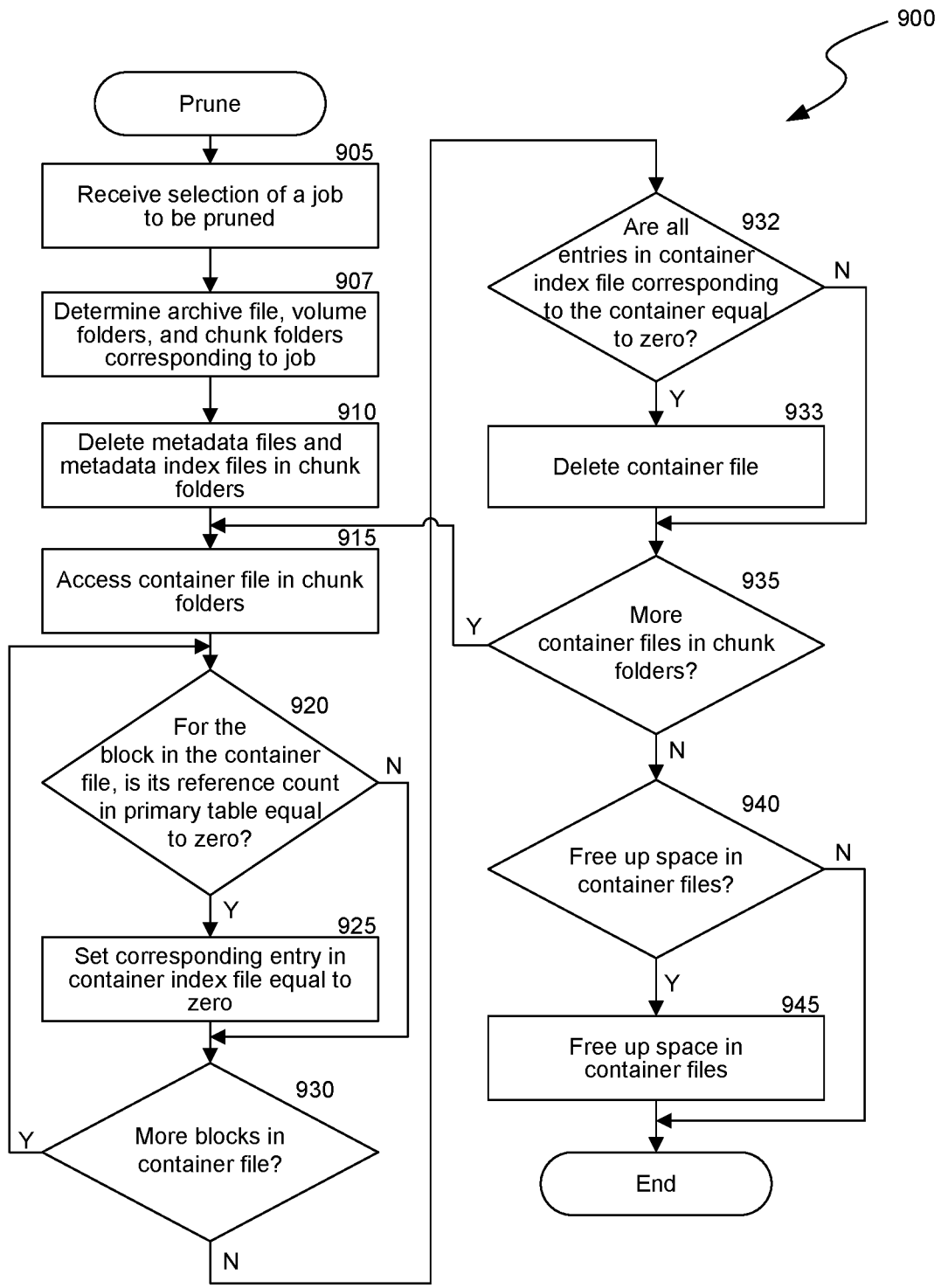
FIG. 9 is a flow diagram of a process for pruning data.

FIGS. 8 and 9 are process flow diagrams. FIG. 8 illustrates an example process that the secondary storage computing device may perform to restore data stored on the storage device, such as to a computing device. FIG. 9 depicts an example process that the secondary storage computing device may perform to prune data stored on the storage device when it is no longer required to be stored on the storage device.

Suitable Data Storage System

FIG. 1 illustrates an example of one arrangement of resources in a computing network, comprising a data storage system 150. The resources in the data storage system 150 may employ the processes and techniques described herein. The system 150 includes a storage manager 105, one or more data agents 195, one or more secondary storage computing devices 165, one or more storage devices 115, one or more computing devices 130 (called clients 130), one or more data or information stores 160 and 162, and a single instancing database 123. The storage manager 105 includes an index 111, a jobs agent 120, an interface agent 125, and a management agent 131. The system 150 may represent a modular storage system such as the CommVault QiNetix system, and also the CommVault GALAXY backup system, available from CommVault Systems, Inc. of Oceanport, N.J., aspects of which are further described in the commonly-assigned U.S. patent application Ser. No. 09/610,738, now U.S. Pat. No. 7,035,880, the entirety of which is incorporated by reference herein. The system 150 may also represent a modular storage system such as the CommVault Simpana system, also available from CommVault Systems, Inc.

The system 150 may generally include combinations of hardware and software components associated with performing storage operations on electronic data. Storage operations include copying, backing up, creating, storing, retrieving, and/or migrating primary storage data (e.g., data stores 160 and/or 162) and secondary storage data (which may include, for example, snapshot copies, backup copies, hierarchical storage management (HSM) copies, archive copies, and other types of copies of electronic data stored on storage devices 115). The system 150 may provide one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information.

In one example, storage operations may be performed according to various storage preferences, for example, as expressed by a user preference, a storage policy, a schedule policy, and/or a retention policy. A "storage policy" is generally a data structure or other information source that includes a set of preferences and other storage criteria associated with performing a storage operation. The preferences and storage criteria may include, but are not limited to, a storage location, relationships between system components, network pathways to utilize in a storage operation, data characteristics, compression or encryption requirements, preferred system components to utilize in a storage operation, a single instancing or variable instancing policy to apply to the data, and/or other criteria relating to a storage operation. For example, a storage policy may indicate that certain data is to be stored in the storage device 115, retained for a specified period of time before being aged to another tier of secondary storage, copied to the storage device 115 using a specified number of data streams, etc.

A "schedule policy" may specify a frequency with which to perform storage operations and a window of time within which to perform them. For example, a schedule policy may specify that a storage operation is to be performed every Saturday morning from 2:00 a.m. to 4:00 a.m. A "retention policy" may specify how long data is to be retained at specific tiers of storage or what criteria must be met before data may be pruned or moved from one tier of storage to another tier of storage. In some cases, the storage policy includes information generally specified by the schedule policy and/or the retention policy. (Put another way, the storage policy includes the schedule policy and/or the retention policy.) Storage policies, schedule policies and/or retention policies may be stored in a database of the storage manager 105, to archive media as metadata for use in restore operations or other storage operations, or to other locations or components of the system 150.

The system 150 may comprise a storage operation cell that is one of multiple storage operation cells arranged in a hierarchy or other organization. Storage operation cells may be related to backup cells and provide some or all of the functionality of backup cells as described in the assignee's U.S. patent application Ser. No. 09/354,058, now U.S. Pat. No. 7,395,282, which is incorporated herein by reference in its entirety. However, storage operation cells may also perform additional types of storage operations and other types of storage management functions that are not generally offered by backup cells.

Storage operation cells may contain not only physical devices, but also may represent logical concepts, organizations, and hierarchies. For example, a first storage operation cell may be configured to perform a first type of storage operations such as HSM operations, which may include backup or other types of data migration, and may include a variety of physical components including a storage manager 105 (or management agent 131), a secondary storage computing device 165, a client 130, and other components as described herein. A second storage operation cell may contain the same or similar physical components; however, it may be configured to perform a second type of storage operations, such as storage resource management (SRM) operations, and may include monitoring a primary data copy or performing other known SRM operations.

Thus, as can be seen from the above, although the first and second storage operation cells are logically distinct entities configured to perform different management functions (i.e., HSM and SRM, respectively), each storage operation cell may contain the same or similar physical devices. Alternatively, different storage operation cells may contain some of the same physical devices and not others. For example, a storage operation cell configured to perform SRM tasks may contain a secondary storage computing device 165, client 130, or other network device connected to a primary storage volume, while a storage operation cell configured to perform HSM tasks may instead include a secondary storage computing device 165, client 130, or other network device connected to a secondary storage volume and not contain the elements or components associated with and including the primary storage volume. (The term "connected" as used herein does not necessarily require a physical connection; rather, it could refer to two devices that are operably coupled to each other, communicably coupled to each other, in communication with each other, or more generally, refer to the capability of two devices to communicate with each other.) These two storage operation cells, however, may each include a different storage manager 105 that coordinates storage operations via the same secondary storage computing devices 165 and storage devices 115. This "overlapping" configuration allows storage resources to be accessed by more than one storage manager 105, such that multiple paths exist to each storage device 115 facilitating failover, load balancing, and promoting robust data access via alternative routes.

Alternatively or additionally, the same storage manager 105 may control two or more storage operation cells (whether or not each storage operation cell has its own dedicated storage manager 105). Moreover, in certain embodiments, the extent or type of overlap may be user-defined (through a control console) or may be automatically configured to optimize data storage and/or retrieval.

The clients 130 typically include application software for performing various operations. Clients 130 typically also include an operating system on which the application software runs. A file system can be provided to facilitate and control file access by the operating system and application software. File systems can facilitate access to local and remote storage devices for file or data access and storage. Clients 130 can also include local storage such as a media module media drive with fixed or removable media.

In some examples, the clients 130 include storage mechanisms for allowing computer programs or other instructions or data to be loaded into memory for execution. Such storage mechanisms might include, for example, a fixed or removable storage unit and an interface. Examples of such storage units and interfaces can include a program cartridge and cartridge interface, a removable memory (for example, a flash memory or other removable memory module) and memory slot, a PCMCIA slot and card, and other fixed or removable storage units and interfaces that allow software and data to be transferred from the storage unit to memory.

Data agent 195 may be a software module or part of a software module that is generally responsible for performing storage operations on the data of the client 130 stored in data store 160/162 or other memory location. Each client 130 may have at least one data agent 195 and the system 150 can support multiple clients 130. Data agent 195 may be distributed between client 130 and storage manager 105 (and any other intermediate components), or it may be deployed from a remote location or its functions approximated by a remote process that performs some or all of the functions of data agent 195.

As used herein, the term module might describe a given unit of functionality that can be performed in accordance with one or more embodiments of the present invention. As used herein, a module might be implemented utilizing any form of hardware, software, firmware, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

The overall system 150 may employ multiple data agents 195, each of which may perform storage operations on data associated with a different application. For example, different individual data agents 195 may be designed to handle Microsoft Exchange data, Lotus Notes data, Microsoft Windows file system data, Microsoft Active Directory Objects data, Microsoft SQL Server data, Microsoft Sharepoint Server data, and other types of data known in the art. Other embodiments may employ one or more generic data agents 195 that can handle and process multiple data types rather than using the specialized data agents described above.

If a client 130 has two or more types of data, one data agent 195 may be required for each data type to perform storage operations on the data of the client 130. For example, to back up, migrate, and restore all the data on a Microsoft Exchange server, the client 130 may use one Microsoft Exchange Mailbox data agent 195 to back up the Exchange mailboxes, one Microsoft Exchange Database data agent 195 to back up the Exchange databases, one Microsoft Exchange Public Folder data agent 195 to back up the Exchange Public Folders, and one Microsoft Windows File System data agent 195 to back up the file system of the client 130. These data agents 195 would be treated as four separate data agents 195 by the system even though they reside on the same client 130.

Alternatively, the overall system 150 may use one or more generic data agents 195, each of which may be capable of handling two or more data types. For example, one generic data agent 195 may be used to back up, migrate and restore Microsoft Exchange Mailbox data and Microsoft Exchange Database data while another generic data agent 195 may handle Microsoft Exchange Public Folder data and Microsoft Windows File System data, etc.

Data agents 195 may be responsible for arranging or packing data to be copied or migrated into a certain format such as an archive file. Nonetheless, it will be understood that this represents only one example, and any suitable packing or containerization technique or transfer methodology may be used if desired. Such an archive file may include metadata, a list of files or data objects copied, the file, and data objects themselves. Moreover, any data moved by the data agents may be tracked within the system by updating indexes associated with appropriate storage managers 105 or secondary storage computing devices 165. As used herein, a file or a data object refers to any collection or grouping of bytes of data that can be viewed as one or more logical units.

Generally speaking, storage manager 105 may be a software module or other application that coordinates and controls storage operations performed by the system 150. Storage manager 105 may communicate with some or all elements of the system 150, including clients 130, data agents 195, secondary storage computing devices 165, and storage devices 115, to initiate and manage storage operations (e.g., backups, migrations, data recovery operations, etc.).

Storage manager 105 may include a jobs agent 120 that monitors the status of some or all storage operations previously performed, currently being performed, or scheduled to be performed by the system 150. (One or more storage operations are alternatively referred to herein as a "job" or "jobs.") Jobs agent 120 may be communicatively coupled to an interface agent 125 (e.g., a software module or application). Interface agent 125 may include information processing and display software, such as a graphical user interface ("GUI"), an application programming interface ("API"), or other interactive interface through which users and system processes can retrieve information about the status of storage operations. For example, in an arrangement of multiple storage operations cell, through interface agent 125, users may optionally issue instructions to various storage operation cells regarding performance of the storage operations as described and contemplated herein. For example, a user may modify a schedule concerning the number of pending snapshot copies or other types of copies scheduled as needed to suit particular needs or requirements. As another example, a user may employ the GUI to view the status of pending storage operations in some or all of the storage operation cells in a given network or to monitor the status of certain components in a particular storage operation cell (e.g., the amount of storage capacity left in a particular storage device 115).

Storage manager 105 may also include a management agent 131 that is typically implemented as a software module or application program. In general, management agent 131 provides an interface that allows various management agents 131 in other storage operation cells to communicate with one another. For example, assume a certain network configuration includes multiple storage operation cells hierarchically arranged or otherwise logically related in a WAN or LAN configuration. With this arrangement, each storage operation cell may be connected to the other through each respective interface agent 125. This allows each storage operation cell to send and receive certain pertinent information from other storage operation cells, including status information, routing information, information regarding capacity and utilization, etc. These communications paths may also be used to convey information and instructions regarding storage operations.

For example, a management agent 131 in a first storage operation cell may communicate with a management agent 131 in a second storage operation cell regarding the status of storage operations in the second storage operation cell. Another illustrative example includes the case where a management agent 131 in a first storage operation cell communicates with a management agent 131 in a second storage operation cell to control storage manager 105 (and other components) of the second storage operation cell via management agent 131 contained in storage manager 105.

Another illustrative example is the case where management agent 131 in a first storage operation cell communicates directly with and controls the components in a second storage operation cell and bypasses the storage manager 105 in the second storage operation cell. If desired, storage operation cells can also be organized hierarchically such that hierarchically superior cells control or pass information to hierarchically subordinate cells or vice versa.

Storage manager 105 may also maintain an index, a database, or other data structure 111. The data stored in database 111 may be used to indicate logical associations between components of the system, user preferences, management tasks, media containerization and data storage information or other useful data. For example, the storage manager 105 may use data from database 111 to track logical associations between secondary storage computing device 165 and storage devices 115 (or movement of data as containerized from primary to secondary storage).

Generally speaking, the secondary storage computing device 165, which may also be referred to as a media agent, may be implemented as a software module that conveys data, as directed by storage manager 105, between a client 130 and one or more storage devices 115 such as a tape library, a magnetic media storage device, an optical media storage device, or any other suitable storage device. In one embodiment, secondary storage computing device 165 may be communicatively coupled to and control a storage device 115. A secondary storage computing device 165 may be considered to be associated with a particular storage device 115 if that secondary storage computing device 165 is capable of routing and storing data to that particular storage device 115.

In operation, a secondary storage computing device 165 associated with a particular storage device 115 may instruct the storage device to use a robotic arm or other retrieval means to load or eject a certain storage media, and to subsequently archive, migrate, or restore data to or from that media. Secondary storage computing device 165 may communicate with a storage device 115 via a suitable communications path such as a SCSI or Fibre Channel communications link. In some embodiments, the storage device 115 may be communicatively coupled to the storage manager 105 via a SAN.

Each secondary storage computing device 165 may maintain an index, a database, or other data structure 161 that may store index data generated during storage operations for secondary storage (SS) as described herein, including creating a metabase (MB). For example, performing storage operations on Microsoft Exchange data may generate index data. Such index data provides a secondary storage computing device 165 or other external device with a fast and efficient mechanism for locating data stored or backed up. Thus, a secondary storage computing device index 161, or a database 111 of a storage manager 105, may store data associating a client 130 with a particular secondary storage computing device 165 or storage device 115, for example, as specified in a storage policy, while a database or other data structure in secondary storage computing device 165 may indicate where specifically the data of the client 130 is stored in storage device 115, what specific files were stored, and other information associated with storage of the data of the client 130. In some embodiments, such index data may be stored along with the data backed up in a storage device 115, with an additional copy of the index data written to index cache in a secondary storage device. Thus the data is readily available for use in storage operations and other activities without having to be first retrieved from the storage device 115.

Generally speaking, information stored in cache is typically recent information that reflects certain particulars about operations that have recently occurred. After a certain period of time, this information is sent to secondary storage and tracked. This information may need to be retrieved and uploaded back into a cache or other memory in a secondary computing device before data can be retrieved from storage device 115. In some embodiments, the cached information may include information regarding format or containerization of archives or other files stored on storage device 115.

One or more of the secondary storage computing devices 165 may also maintain one or more single instance databases 123. More details as to single instancing may be found in one or more of the following commonly-assigned U.S. patent applications: 1) U.S. patent application Ser. No. 11/269,512 (entitled SYSTEM AND METHOD TO SUPPORT SINGLE INSTANCE STORAGE OPERATIONS); 2) U.S. patent application Ser. No. 12/145,347 (entitled APPLICATION-AWARE AND REMOTE SINGLE INSTANCE DATA MANAGEMENT); or 3) U.S. patent application Ser. No. 12/145,342 (entitled APPLICATION-AWARE AND REMOTE SINGLE INSTANCE DATA MANAGEMENT), 4) U.S. patent application Ser. No. 11/963,623 (entitled SYSTEM AND METHOD FOR STORING REDUNDANT INFORMATION); 5) U.S. patent application Ser. No. 11/950,376 (entitled SYSTEMS AND METHODS FOR CREATING COPIES OF DATA SUCH AS ARCHIVE COPIES); or 6) the previously-referenced U.S. patent application Ser. No. 12/565,576, each of which is incorporated by reference herein in its entirety.

In some examples, the secondary storage computing devices 165 maintain one or more variable instance databases. Variable instancing generally refers to storing in secondary storage one or more instances, but fewer than the total number of instances, of each data block (or data object) in a set of data (e.g., primary data). More details as to variable instancing may be found in the commonly-assigned U.S. Pat. App. No. 61/164,803 (entitled STORING A VARIABLE NUMBER OF INSTANCES OF DATA OBJECTS).

In some embodiments, certain components may reside and execute on the same computer. For example, in some embodiments, a client 130 such as a data agent 195, or a storage manager 105, coordinates and directs local archiving, migration, and retrieval application functions as further described in the previously-referenced U.S. patent application Ser. No. 09/610,738. This client 130 can function independently or together with other similar clients 130.

As shown in FIG. 1, each secondary storage computing device 165 has its own associated metabase 161. Each client 130 may also have its own associated metabase 170. However in some embodiments, each "tier" of storage, such as primary storage, secondary storage, tertiary storage, etc., may have multiple metabases or a centralized metabase, as described herein. For example, rather than a separate metabase or index associated with each client 130 in FIG. 1, the metabases on this storage tier may be centralized. Similarly, second and other tiers of storage may have either centralized or distributed metabases. Moreover, mixed architecture systems may be used if desired, that may include a first tier centralized metabase system coupled to a second tier storage system having distributed metabases and vice versa, etc.

Moreover, in operation, a storage manager 105 or other management module may keep track of certain information that allows the storage manager 105 to select, designate, or otherwise identify metabases to be searched in response to certain queries as further described herein. Movement of data between primary and secondary storage may also involve movement of associated metadata and other tracking information as further described herein.

In some examples, primary data may be organized into one or more sub-clients. A sub-client is a portion of the data of one or more clients 130, and can contain either all of the data of the clients 130 or a designated subset thereof. As depicted in FIG. 1, the data store 162 includes two sub-clients. For example, an administrator (or other user with the appropriate permissions; the term administrator is used herein for brevity) may find it preferable to separate email data from financial data using two different sub-clients having different storage preferences, retention criteria, etc.

Components of a Block-Level Single Instancing System

FIG. 2 is a block diagram depicting in more detail certain components illustrated in FIG. 1. The data agent 195 of the client 130 includes various components, such as a data identification component 202, a block identification component 204, and an identifier generation component 206. The data agent 195 also includes a compression component 210, an encryption component 212, and a data stream generation component 214. Various functions performed by these components are described herein.

In addition to the data agent 195, the client 130 includes data 240. The data 240 includes single instanceable data (SI data) 242 and non-single instanceable data (non-SI data) 244. SI data 242 includes data that is eligible for single instancing. Non-SI data 244 includes data that is not eligible for single instancing. Non-SI data 244 may include metadata such as access control lists (ACLs), disk partition information, Master File Table (MFT) or File Allocation Table (FAT) information, and/or other metadata. Non-SI data 244 may also include other data that is determined not to be single instanceable. SI data 242 may include data 240 of the client 130 other than non-SI data 244 (e.g., system files, application files, user files, etc.).

The secondary storage computing device 165 includes a data stream reception component 220 and an identifier comparison component 222. Various functions performed by these components are also described in detail herein. The secondary storage computing device 165 also includes a memory 230, which includes multiple buffers 232. The secondary storage computing device 165 may also include other components, such as a decompression component and/or a decryption component. The single instance database 123 includes data structures 250 that are used to store data, such as metadata about SI data 242. The storage device 115 also includes data structures 260 that are used to store data, such as SI data 242 and non-SI data 244. In some examples, the secondary storage computing device 165 includes the components that the client 130 includes, and performs the functions that the client 130 performs.

Processes for Performing Storage Operations

FIGS. 3 and 4 are flow diagrams illustrating certain aspects of processes 300 and 400, respectively, for performing a storage operation such as a copy operation. A storage operation (alternatively referred to as a job) is typically performed on files stored on file systems of one or more clients 130. One or more of the entities illustrated in the figures (e.g., FIGS. 1 and/or 2) may perform different aspects of the processes 300 and 400. In some examples, a storage manager 105 instigates the process 300 by sending an indication specifying the storage operation to the data agent 195. The data agent 195 accesses the data of the client 130 (e.g., accesses files stored on the filesystem of the client 130). The data agent 195 sends the data to the secondary storage computing device 165, which then stores the data on one or more storage devices 115. In some examples, less than all of these entities may be involved in performing the storage operation. The process 300 is described as being performed by the data agent 195 and the process 400 is described as being performed by the secondary storage computing device 165. However, those of skill in the art will understand that aspects of the processes 300 and 400 may be performed by any one or more of the entities described herein (e.g., the data agent 195, the storage manager 105, the secondary storage computing device 165, etc.).

The process 300 begins at step 305 where the data agent 195 receives an indication to copy data of the client 130. The storage manager 105 may send the indication to the data agent 195 (e.g., according to a storage policy), an administrator may manually start the process 300, and/or the process 300 may be automatically started according to a schedule policy.

At step 310 the data agent 195 accesses the data 240 of the client 130. The data agent 195 (e.g., the data identification component 202) determines which portions of the data 240 are SI data 242 and which portions are non-SI data 244. For example, the data agent 195 may determine that metadata (e.g., MFT, FAT, volume information, transaction logs, etc.) on the file system of the client 130 is non-SI data 244, and that data other than metadata is SI data 242 (e.g., system files, user files, etc.). At step 315 the data agent 195 (e.g., the data stream generation component 214) forms a data stream of multiple pairs of stream header and stream payload from the SI data 242 and the non-SI data 244. (An example data stream is illustrated in FIG. 5A and is described in detail below.) A data stream, therefore, comprises multiple pairs of stream header and stream payload. However, those of skill in the art will understand that data streams may contain data organized in other fashions. For the SI data 242, the data agent 195 may set a flag in the stream header to indicate that the corresponding stream payload contains single instanceable data.

At step 320, the data agent 195 (e.g., the identifier generation component 206) aligns the stream header and stream payload into one or more fixed size blocks of data. (An example data stream with stream header and stream payload aligned into multiple blocks is illustrated in FIG. 5B and is described in detail below.) A block of data (alternatively called a data block) is a sequence of bits or bytes having a nominal length (a data block size). The file system of the client 130 may track its data 240 in blocks (alternatively called clusters) in sizes of 512 bytes, 4 KB, 16 KB, or other sizes. (Put another way, a block may be a subset of one or more data objects.) A file on the file system of the client 130 typically spans one or more blocks (e.g., a file of size 10 KB may span 3 blocks of size 4 KB). The data agent 195 typically aligns data blocks such that they have the same size, which may be 32 KB, 64 KB, 128 KB, 256 KB, 512 KB, or other sizes. Accordingly, the term data block, as used herein, may comprise one or more blocks as tracked by the file system of the clients 130. For example, if the file system of a client 130 tracks its data 240 in blocks of size 4 KB and if the data agent 195 aligns the client's 130 data 240 into data blocks of size 128 KB, then these 128 KB data blocks comprise 32 blocks of data 240 as tracked by the file system of the client 130.

At step 325 the data agent 195 determines whether a data block is single instanceable. The data agent 195 does so by analyzing the portion of the one or more corresponding stream headers that indicates whether the data block is single instanceable. For example, the stream headers may contain a flag or bit that indicates whether the successive stream payload contain single instanceable data. (For example, see FIG. 5A, illustrating stream headers containing such flags.) If the data block is single instanceable, the process 300 continues at step 330, where the data agent 195 (e.g., the identifier generation component 206) generates an identifier for the data block.

Examples of identifiers include a hash value, message digest, checksum, digital fingerprint, digital signature or other sequence of bytes that substantially uniquely identifies the data block in the data storage system. For example, identifiers could be generated using Message Digest Algorithm 5 (MD5) or Secure Hash Algorithm SHA 512. In some instances, the phrase "substantially unique" is used to modify the term "identifier" because algorithms used to produce hash values may result in collisions, where two different data objects, when hashed, result in the same hash value. However, depending upon the algorithm or cryptographic hash function used, collisions should be suitably rare and thus the identifier generated for a block should be unique throughout the data storage system. The term "probabilistically unique identifier" may also be used. In this case, the phrase "probabilistically unique" is used to indicate that collisions should be low-probability occurrences, and, therefore, the identifier should be unique throughout the data storage system.

At step 335 the data agent 195 (e.g., the identifier generation component 206) inserts the generated identifier into the data stream. The generated identifier may be comprised in an identifier header and identifier data pair that immediately follows the data block for which it is generated. (See FIG. 5B and the accompanying description for additional details of the identifier header and identifier data pair.) At step 340 the data agent 195 determines whether there are more data blocks. If so, the process 300 returns to step 325. If not, the process 300 continues at step 345, where the data agent 195 transfers the data stream to the secondary storage computing device 165. The process 300 then ends. In some examples, the data agent 195 may perform additional operations upon the stream header and/or stream payload, such as encrypting the stream payload (e.g., using the encryption component 212) and/or compressing the stream payload (e.g., using the compression component 210).

FIG. 4 is a flow diagram illustrating certain aspects of the process 400 that the secondary storage computing device 165 performs upon receiving the data stream from the data agent 195. At step 405 the secondary storage computing device 165 receives the data stream from the data agent 195. At step 410, the secondary storage computing device 165 stores the stream header and stream payload corresponding to a data block in a buffer 232 of the memory 230. The secondary storage computing device 165 can store the entire stream header and stream payload pairs corresponding to a single block in a single buffer, because the buffer size (e.g., approximately 640 KB) is greater than the size of the stream header and stream payload pairs (e.g., up to approximately 512 KB). The buffer size is typically no greater than 10 times the size of the stream header and stream payload pairs. In some examples, the memory 230 includes 30 buffers 232, thus allowing the secondary storage computing device 165 to simultaneously store up to 30 different data blocks in fast-access memory. The ability to store multiple data blocks in memory enables the secondary storage computing device 165 to avoid writing the multiple data blocks to disk, which can be a lengthy operation.

At step 415 the secondary storage computing device 165 determines whether the data block is single instanceable. The secondary storage computing device 165 may do so, for example, by analyzing the metadata in the stream header that indicates whether the data block is single instanceable (e.g., a flag or bit that indicates whether the data block is single instanceable).

If the data block is single instanceable, the process 400 continues at step 425, where the secondary storage computing device (e.g., the identifier comparison component 222) obtains the identifier corresponding to the data block (e.g., from the identifier data of the data stream) and looks up the identifier. The secondary storage computing device 165 looks up the identifier in the primary table in the single instance database 123. (Example data structures used by the single instance database 123 are illustrated in FIGS. 6A and 6B and described with reference to these figures).

At step 430, if the secondary storage computing device 165 finds the identifier of the data block in the primary table, this indicates that an instance of the data block is already stored on the storage device 115, and that the block of data should not be stored. Accordingly, the secondary storage computing device 165 can avoid storing another instance of the data block and can instead store a link (alternatively called a pointer) to the location(s) of the already stored instance. At step 445 the secondary storage computing device 165 adds a link to the location(s) of the already stored instance of the data block to a metadata file. The link refers or points to the already stored instance of the data block. For example, the secondary storage computing device 165 may add as the link to the metadata file the record of the already stored instance of the data block in the primary table. At step 450 the secondary storage computing device 165 adds an entry to the secondary table in the single instance database. The entry includes the location of the link in the metadata file. The secondary storage computing device 165 also increments a reference count corresponding to the data block in the primary table. The reference count indicates the number of links to the already stored instance of the data block. At step 455 the secondary storage computing device 165 discards the stream header and stream payload corresponding to the data block from the buffer 232 of the memory 230. Additionally or alternatively, the secondary storage computing device 165 may indicate that the buffer is available for storing another pair of stream header and stream payload.

If the secondary storage computing device 165 does not find the identifier of the block in the primary table (step 430), this indicates that no instances of the data block are already stored on the storage device 115, and that the block of data should be stored. Accordingly, at step 435 the secondary storage computing device 165 stores the data block in a container file on the storage device 115. (See FIG. 7 and the accompanying description for additional details of container files.) At step 440 the secondary storage computing device 165 adds an entry to the primary table in the single instance database. The entry includes the location of the data block in the container file.

If the data block is not single instanceable (step 415), the process 400 continues at step 420, where the secondary storage computing device 165 stores the block in a metadata file. (See FIG. 7 and the accompanying description for additional details of metadata files.) The three branches of the process 400 converge at step 460, where the secondary storage computing device 165 determines whether there are more data blocks. If so, the process 400 returns to step 415. If not the process 400 concludes.

In some examples, the secondary storage computing device 165 may perform additional operations during the process 400, such as decrypting the stream payload (e.g., using a decryption component) and/or decompressing the stream payload (e.g., using a decompression component). The secondary storage computing device 165 may also store in the index 161, for the data blocks, information mapping an archive file and offset to the physical location of the data blocks. An archive file is a logical entity that is created during a storage operation and that corresponds to physical locations of data blocks on the storage device 115. The storage manager 105 may map archive files to physical locations and keep such information in index 111.

In some examples, a variable number of instances of data blocks (e.g., more than one instance and up to N−1 instances, where N is the number of instances of the data block in primary data) is stored on the storage devices 115. In such examples, the secondary storage computing devices 165 may use techniques described in the previously referenced U.S. Pat. App. No. 61/164,803 to ensure that a sufficient number of instances of the blocks of data are stored on the storage devices 115. Storing multiple instances (up to N−1) of N data blocks provides for less risk of data loss than single instance storage techniques, and generally nearly as less risk of data loss as conventional data protection techniques (which store N instances of N data blocks). Storing multiple instances (up to N−1) of N data blocks also provides for more efficient use of available storage space than conventional data protection techniques, and almost as efficient use as single instance storage techniques. Accordingly, the storing of a variable number of instances of data blocks enables an administrator to tailor data protection to strike an appropriate balance between 1) minimizing the risk of data loss, and 2) making efficient use of available data storage space, in accordance with the administrator's requirements.

Suitable Data Structures

FIGS. 5A and 5B are diagrams of example data streams 500 and 550, respectively, that may be employed by aspects of the invention. Referring to FIG. 5A, the data agent 195 forms the data stream 500 from the data 240 of the client 130. The data stream 500 is composed of multiple pairs of stream header 502 and stream payload 504. A stream payload 504 includes SI data 242 and/or non-SI data 244. A stream header 502 includes metadata about the stream payload 504. This metadata may include, for example, a length of the stream payload 504, an indication of whether the stream payload 504 is encrypted, an indication of whether the stream payload 504 is compressed, an archive file identifier (ID), an indication of whether the stream payload 504 is single instanceable, and an indication of whether the stream payload 504 is a start of a block of data.

Referring to FIG. 5B, the data stream 550 has the stream header 502 and stream payload 504 aligned into multiple data blocks. In this example, the data blocks are of size 64 KB. The first two stream header 502 and stream payload 504 pairs comprise a first data block of size 64 KB. The first stream header 502 indicates that the length of the succeeding stream payload 504 is 63 KB and that it is the start of a data block. (The stream header 502 may also include the metadata discussed with reference to the stream headers 502 illustrated in FIG. 3A.) The next stream header 502 indicates that the succeeding stream payload 504 has a length of 1 KB and that it is not the start of a new data block. Immediately following stream payload 504 are an identifier header 506 and identifier data 508 pair. The identifier header 506 includes an indication that the succeeding identifier data 508 includes the identifier for the immediately previous data block. The identifier data 508 includes the identifier that the data agent (e.g., the identifier generation component 206) generated for the data block. The data stream 550 also includes other stream header 502 and stream payload 504 pairs, which may be for SI data 242 and/or for non-SI data 244.

FIGS. 6A and 6B are diagrams illustrating the data structures 250 that may be used by the single instance database 123. The data structures 250 do not form part of a native file system of a storage device storing the single instance database 123. Alternatively, the data structures 250 are not provided by any native file system for storage devices at least as of the time of the filing of the provisional patent application to which this application claims priority. The data structures 250 include a primary table 600 and a secondary table 650.

Referring to FIG. 6A, the primary table 600 includes an identifier column 602 in which a data block identifier is stored, a location column 604 in which a location of the data block in a container file is stored, an offset column 606 indicating the offset within the container file corresponding to the location of the data block, and a reference count column 608, which contains a reference count of the number of links that refer to the data block. For example, row 620 includes information about a data block for which the identifier is "0xA1B3FG." This data block is located in the container file that is indicated in the location column 606, at an offset of 10 within the container file. As indicated in the reference count column 608, this data block is referred to twice, meaning that there are two links that refer to the data block. As another example, row 624 includes information about a data block for which the identifier is "0xC13804." The location of this data block is indicated in the location column 604 at an offset of 38 within the container file, and it is referred to one other time, by one link.

Referring to FIG. 6B, the secondary table 650 includes information about links that refer to data blocks. The secondary table 650 includes an identifier column 652, a referring location column 654, and an offset column 656. For example, row 660 includes information about a reference to the data block having the identifier of "0xA1B3FG" (row 620 in the primary table 600). The location of the link is indicated in column 654, at an offset of five within the indicated metadata file. As another example, row 662 includes information about another reference to the data block having the identifier of "0xA1B3FG." This link is located at the location indicated in column 654, at an offset of 15 within the indicated metadata file. As another example, row 664 includes information about a reference to the block for which the identifier is "0xC13804" (row 624 in the primary table 600). The location of the link is indicated in column 654, at an offset of 19 within the indicated metadata file.

FIG. 7 is a diagram illustrating the data structures 260 that may be used to store blocks of SI data and non-SI data on the storage device 115. The data structures 260 do not form part of a native file system of the storage device 115. Alternatively, the data structures 260 are not provided by any native file systems for storage devices at least as of the time of the filing of the provisional patent application to which this application claims priority.

The data structures 260 include one or more volume folders 702, one or more chunk folders 704/705 within a volume folder 702, and multiple files within a chunk folder 704. Each chunk folder 704/705 includes a metadata file 706/707, a metadata index file 708/709, one or more container files 710/711/713, and a container index file 712/714. The metadata file 706/707 stores non-SI data blocks as well as links to SI data blocks stored in container files. The metadata index file 708/709 stores an index to the data in the metadata file 706/707. The container files 710/711/713 store SI data blocks. The container index file 712/714 stores an index to the container files 710/711/713. Among other things, the container index file 712/714 stores an indication of whether a corresponding block in a container file 710/711/713 is referred to by a link in a metadata file 706/707. For example, data block B2 in the container file 710 is referred to by a link in the metadata file 707 in the chunk folder 705. Accordingly, the corresponding index entry in the container index file 712 indicates that the data block B2 in the container file 710 is referred to. As another example, data block B1 in the container file 711 is referred to by a link in the metadata file 707, and so the corresponding index entry in the container index file 712 indicates that this data block is referred to.

As an example, the data structures 260 illustrated in FIG. 7 may have been created as a result of two storage operations involving two clients 130. For example, a first storage operation on a first client 130 could result in the creation of the first chunk folder 704, and a second storage operation on a second client 130 could result in the creation of the second chunk folder 705. The container files 710/711 in the first chunk folder 704 would contain the blocks of SI data 242 of the first client 130. If the two clients 130 have substantially similar data 240, the second storage operation on the data 240 of the second client 130 would result in the secondary storage computing device 165 storing primarily links to the data blocks of the first client 130 that are already stored in the container files 710/711. Accordingly, while a first storage operation may result in storing nearly all of the data subject to the storage operation, subsequent storage operations involving similar data may result in substantial data storage space savings, because links to already stored data blocks can be stored instead of additional instances of data blocks.

If the operating system of the secondary storage computing device 165 supports sparse files, then when the secondary storage computing device 165 creates container files 710/711/713, it can create them as sparse files. As previously described, a sparse file is type of file that may include empty space (e.g., a sparse file may have real data within it, such as at the beginning of the file and/or at the end of the file, but may also have empty space in it that is not storing actual data, such as a contiguous range of bytes all having a value of zero). Having the container files 710/711/713 be sparse files allows the secondary storage computing device 165 to free up space in the container files 710/711/713 when blocks of data in the container files 710/711/713 no longer need to be stored on the storage devices 115. In some examples, the secondary storage computing device 165 creates a new container file 710/711/713 when a container file 710/711/713 either includes 100 blocks of data or when the size of the container file 710 exceeds 50 Mb. In other examples, the secondary storage computing device 165 creates a new container file 710/711/713 when a container file 710/711/713 satisfies other criteria (e.g., it contains from approximately 100 to approximately 1000 blocks or when its size exceeds approximately 50 Mb to 1 Gb). Those of skill in the art will understand that the secondary storage computing device 165 can create a new container file 710/711/713 when other criteria are met.

In some cases, a file on which a storage operation is performed may comprise a large number of data blocks. For example, a 100 Mb file may be comprised in 400 data blocks of size 256 KB. If such a file is to be stored, its data blocks may span more than one container file, or even more than one chunk folder. As another example, a database file of 20 Gb may comprise over 40,000 data blocks of size 512 KB. If such a database file is to be stored, its data blocks will likely span multiple container files, multiple chunk folders, and potentially multiple volume folders. As described in detail herein, restoring such files may thus requiring accessing multiple container files, chunk folders, and/or volume folders to obtain the requisite data blocks.

One advantage of the data structures 260 illustrated in FIG. 7 and/or of the techniques described herein is that they significantly reduce the number of files stored on a file system of the storage device 115. This is at least partly due to the storage of data blocks within the container files 710/711/713. Even if numerous storage operations using these data structures 260 are performed, this will result in far fewer files on the storage device 115 than storage operations where each data block is stored as a separate file. Therefore, the file system of the storage device 115 may not necessarily have to contend with storing excessively large numbers of files, such as millions of files or more. Accordingly, the systems and methods described herein enable very large numbers of blocks of data to be stored without regard to limitations of the file system of the storage device 115.

Another advantage is that the data storage system enables a reduction in the amount of blocks of data stored on the storage devices 115, while still maintaining at least one instance of each block of primary data. In examples where the data storage system stores a variable number of instances of blocks of primary data, blocks of primary data can be distributed across two or more storage devices 115, thereby adding a further aspect of redundancy.

Another advantage is that the metadata files 706/707, the metadata index files 708/709, the container files 710/711/713, and/or the container index files 712/714 could be used to replicate the data stored in the single instance database 123 or reconstruct the single instance database 123 if the data of the single instance database 123 is ever lost and/or corrupted.

The storage of data blocks in the container files may create additional complexities when it comes time to prune data blocks (pruning data blocks may be alternatively referred to as deleting or removing data blocks) that the data storage system no longer need retain. This is because the data blocks are not stored as files on the file system on the storage device 115 and thus cannot be directly referenced by the file system using the file system's data structures (the data structures that are built into or provided with the file system). As described in detail with reference to FIG. 9, the secondary storage computing device 165 uses the container index files 712/714 to keep track of which blocks of data are referenced and thus which blocks are not prunable (deletable).

In some examples, the use of the container index files 712/714, the metadata index files 708/709, and/or the primary and secondary tables 600/650 to track data is analogous to a driver, agent or an additional file system that is layered on top of the existing file system of the storage device 115. This driver/agent/additional file system allows the data storage system to efficiently keep track of very large numbers of blocks of data, without regard to any limitations of the file systems of the storage devices 115. Accordingly, the data storage system can store very large numbers of blocks of data.

Accordingly, the data structures 260 illustrated in FIG. 7 and the techniques described herein enable the performance of multiple storage operations cumulatively involving very large amounts of data, while still allowing for recovery of space on the storage device 115 when storage of certain data blocks is no longer required. For example, the data of numerous clients 130 can be protected without having to store redundant copies or instances of data blocks. Space on the storage device 115 can also be recovered when it is no longer necessary to store certain data blocks. Accordingly, storage operations involving very large amounts of data are enabled and optimized by the techniques described herein.

Process for Restoring Data

FIG. 8 is a flow diagram of a process 800 for restoring one or more blocks of data. The process 800 is described as being performed by the secondary storage computing device 165, although those of skill in the art will understand that aspects of the process 800 may be performed by any of the entities described herein. The process 800 begins at step 805 where the secondary storage computing device 165 receives a selection of data to restore (e.g., one or more files). For example, an administrator may utilize an integrated management console that provides an interface for allowing the administrator to specify one or more data blocks to be restored (e.g., by allowing the administrator to specify one or more files to be restored). As another example, a client 130 may request that a data block that had been previously copied from the client 130 be restored to the client 130. At step 810 the secondary storage computing device 165 determines an archive file and offset within the archive file corresponding to the data to be restored. The secondary storage computing device 165 may analyze the index 111 of the storage manager 105 to determine the archive file and offset.

At step 815 the secondary storage computing device 165 determines volume folders and chunk folders corresponding to the archive file and offset. The secondary storage computing device 165 may do so by analyzing the index 161 to determine the volume folders and chunk folders. The determined volume folders and chunk folders contain the requested data. At step 820 the secondary storage computing device 165 accesses an index file within the determined volume folders and chunk folders that corresponds to the data to be restored. This may be the metadata index file 708/709 when the requested data is non-SI data 244 or the container index file 712/714 when the requested data is SI data 242. At step 825 the secondary storage computing device 165 determines, from the index file, the offset within the metadata file 706/707 or the offset within the container file 710/711/13 corresponding to the requested data. At step 830 the secondary storage computing device 165 accesses the metadata file 706/707 or the container file 710/711/13 and seeks to the determined offset. At step 835 the secondary storage computing device 165 retrieves the data from the metadata file 706/707 or the container file 710/711/13. At step 840 the secondary storage computing device restores the data to a selected location (e.g., to a client 130 and/or to another location). The process 800 then concludes.

As previously noted, restoring a file may necessitate accessing multiple container files, chunk folders, and/or volume folders to obtain the data blocks that comprise the file. The secondary storage computing device 165 may thus have to obtain a first data block from a first container file and a second data block from a second container file. As another example, the secondary storage computing device 165 may thus have to obtain a first data block from a first container file within a first folder and a second data block from a second container file within a second folder. To do so, the secondary storage computing device 165 may have to access multiple index files or other data structures to locate the requisite blocks of data. Those of skill in the art will understand that various techniques may be used to restore data such as files and other data.

Process for Pruning Data

FIG. 9 is a flow diagram of a process 900 for pruning data. The process 900 is described as being performed by the secondary storage computing device 165, although those of skill in the art will understand that aspects of the process 900 may be performed by any of the entities described herein. The process 900 begins when the secondary storage computing device 165 receives instructions to prune data corresponding to a storage operation (job). Additionally or alternatively, one or more files can be selected to be pruned, and/or one or more data blocks can be selected to be pruned. This selection of a job or other data to be deleted can be made manually, such as by an administrator, or automatically, such as by the job, files, and/or data blocks aging out by a retention policy.

As previously noted, the data structures 260 illustrated in FIG. 7 may have been created as a result of two jobs involving two clients 130. For example, a first job on a first client 130 could result in the creation of the first chunk folder 704, and a second job on a second client 130 could result in the creation of the second chunk folder 705. The process 900 is described using this example. More specifically, the process 900 is described below as pruning the data created as a result of the first job. Of course, a similar process may be used to delete other jobs, or even smaller increments of data or data objects, such as individual files or blocks.

At step 907 the secondary storage computing device 165 determines the file, e.g., archive file, and the volume folders 702 and chunk folder 704 corresponding to the job to be pruned. The secondary storage computing device 165 may do so, for example, by analyzing the index 111 and/or the index 161 to determine this information. At step 910 the secondary storage computing device 165 deletes the metadata file 706 and the metadata index file 708 in the chunk folder 704. The secondary storage computing device 165 can delete the metadata file 706 and the metadata index file 708 in this example because these files include non-SI data 244, which is not referenced by any other data.

At step 915 the secondary storage computing device 165 accesses the container file 710 and the container index file 712 in the chunk folder 704. The secondary storage computing device 165 begins iterating through the data blocks in the container files 710. At step 920, beginning with a first block in the container file 710, the secondary storage computing device 165 accesses the primary table 600 in the single instance database 123. The secondary storage computing device 165 determines from the primary table 600 whether the reference count of a data block in the container file 710 is equal to zero. If so, this indicates that there are no references to the data block. The process 900 then continues at step 925, where the secondary storage computing device 165 sets the entry in the container index file 712 corresponding to the data block equal to zero, thus indicating that there are no references to the data block, and therefore prunable.

If the reference count of a data block is not equal to zero, then the data block is not prunable, and the process 900 continues at step 930. At this step, the secondary storage computing device 165 determines whether there are more data blocks in the container file 710. If so, the process 900 returns to step 920, where it accesses the next data block. If there are no more data blocks in the container file 710, the process 900 continues at step 932, where the secondary storage computing device 165 determines whether all the entries in the container index file 712 corresponding to the container file 710 are equal to zero. As illustrated in FIG. 7, the second index entry in the container index file 712 is not equal to zero, thus indicating that the corresponding block in container file 710 is referenced (by data in the chunk folder 705, as earlier described). Accordingly, the container file 710 cannot be deleted.

However, if the container file 710 did not contain any referenced data blocks, then at step 933, the secondary storage computing device 165 would delete the container file 710. The process would then continue at step 935, where the secondary storage computing device 165 determines whether there are more container files. According to the example as illustrated in FIG. 7, there is an additional container file 711. The process 900 then returns to step 915, where it performs the same steps 920-933 for container file 711. As a result of performing these steps, the secondary storage computing device 165 would also determine that the container file 711 cannot be deleted, because it contains a data block that is referenced (by data in the chunk folder 705, as earlier described).

After processing container files 710/711, the process 900 continues at step 940, where the secondary storage computing device 165 determines whether to free up storage space in the container files 710/711. The secondary storage computing device 165 may do so using various techniques. For example, if the operating system of the secondary storage computing device 165 supports sparse files, then the secondary storage computing device 165 may free up space by zeroing out the bytes in the container files corresponding to the space to be freed up. For a certain number of contiguous blocks (e.g., a threshold number of contiguous blocks, such as three contiguous blocks) for which the corresponding entries in the container index file 712 indicate that the blocks are not being referred to, then the secondary storage computing device 165 may mark these portions of the container files 710/711 as available for storage by the operating system or the file system. The secondary storage computing device 165 may do so by calling an API of the operating system to mark the unreferenced portions of the container files 710/711 as available for storage.

The secondary storage computing device 165 may use certain optimizations to manage the number of times portions of the container file are specified or marked as available for storage, such as only zeroing out bytes in container files when a threshold number of unreferenced contiguous blocks is reached (e.g., three or more unreferenced contiguous blocks). These optimizations may result in less overhead for the operating system because it reduces the number of contiguous ranges of zero-value bytes in the container files 710/711 that the operating system must keep track of (e.g., it reduces the amount of metadata about portions of the container files 710/711 that are available for storage).

If the operating system of the secondary storage computing device 165 does not support sparse files, then the secondary storage computing device 165 may free up space by truncating either the beginning or the end of the container files 710/711 (removing or deleting data at the beginning or end of the container files 710/711). The secondary storage computing device 165 may do so by calling an API of the operating system, or by operating directly on the container files 710/711. For example, if a certain number of the last blocks of the container file are not being referred to, the secondary storage computing device 165 may truncate these portions of the container files 710/711. Other techniques may be used to free up space in the container files 710/711 for storage of other data. At step 945 the secondary storage computing device 165 frees up space in the container files 710/711. The process 900 then concludes.

As a result of the process 900, the chunk folder 704 would contain only the container files 710/711 and the container index file 712. At a later time, when the chunk folder 705 is pruned (that is, when the job that created this chunk folder is selected to be pruned), then the container files 710/711 in the chunk folder 704 can be deleted, because they no longer contain data blocks that is referenced by other data. Therefore, pruning data corresponding to a job may also result in pruning data corresponding to an earlier job, because the data corresponding to the earlier job is no longer referenced by the later job.

Although the process 900 is described with reference to the pruning of data corresponding to jobs (one or more storage operations), other data can also be pruned. For example, an administrator may wish to delete SI data 242 but retain non-SI data 244. In such case, the administrator may instruct the secondary storage computing device 165 to delete the container files 710/711/713 but retain the metadata files 706/707 and metadata index files 708/709. As another example, an administrator or storage policy may delete one or more specific files. In such case, the secondary storage computing device 165 deletes the data blocks in the container files 710/711/713 corresponding to the specific files but retains other data blocks. The process 900 may include fewer or more steps than those described herein to accommodate these other pruning examples. Those of skill in the art will understand that data can be pruned in various fashions and therefore, that the process 900 is not limited to the steps described herein.

One advantage of the process 900 and the techniques described herein is that they enable the deletion of data on the storage devices 115 that no longer needs to be stored while still retaining data that needs to be stored, and doing so in a space-efficient manner. Space previously allocated for data blocks that no longer need to be stored can be reclaimed by the data storage system, and used to store other data. Accordingly, the techniques described herein provide for efficient use of available storage space (available on physical media).

CONCLUSION

From the foregoing, it will be appreciated that specific examples of data storage systems have been described herein for purposes of illustration, but that various modifications may be made without deviating from the spirit and scope of the invention. For example, although copy operations may have been described, the system may be used to perform many types of storage operations (e.g., backup operations, restore operations, archival operations, copy operations, Continuous Data Replication (CDR) operations, recovery operations, migration operations, HSM operations, etc.). As another example, although block-level single instancing has been described, the systems and methods detailed herein may be used to single instance files. As another example, the secondary storage computing device 165 may keep track of which blocks of data in container files 710 are not referenced, instead of keeping track of which blocks of data are referred to by links. As another example, non-SI data 244 may not be aligned into blocks of data. Accordingly, the invention is not limited except as by the appended claims.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

If a synchronization process or synchronization processes are described herein, it is not intended to require that multiple synchronizations occur simultaneously or that multiple computing systems being synchronized each receive the same data. Although in some examples the data can be broadcast to all participating computing systems simultaneously (or close to simultaneously), in other examples the data can be sent to different computing systems or groups of computing systems at different times. Likewise, in some examples the same data, or the same subset of the data can be sent to all computing systems. However, in other examples, subsets of the data can be tailored for a given computing system or group of computing systems.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled," as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. As another example, while only one aspect of the invention is recited as a means-plus-function claim under 35 U.S.C. § 112, sixth paragraph, other aspects may likewise be embodied as a means-plus-function claim, or in other forms, such as being embodied in a computer-readable medium. (Any claims intended to be treated under 35 U.S.C. § 112, ¶6 will begin with the words "means for.") Accordingly, the inventors reserve the right to add additional claims after filing the application to pursue such additional claim forms for other aspects of the invention.

We claim:

1. A system for storing a single instance of a data block in a data storage network, the system comprising:
one or more computing devices, the one or more computing devices configured to:
access files on which one or more data storage jobs are performed;
determine a first set of one or more files that are not eligible for single instancing and a second set of one or more files that are eligible for single instancing, wherein the first and second set of one or more files are determined according to one or more parameters provided in an information management policy associated with the one or more computing devices;
divide the first and second set of one or more files into multiple data blocks; and
provide the multiple data blocks to a secondary storage computing device; and
the secondary storage computing device configured to:
receive the multiple data blocks from the one or more computing devices in one or more data streams,
wherein the one or more data streams comprises multiple stream header items, wherein each stream header item containing an indication of whether associated data block is eligible for single instancing.

2. The system of claim 1, wherein the secondary storage computing device comprises one or more memory buffers,
wherein each of the one or more memory buffers has a size that is greater than a size of a data block but is less than ten times the size of the data block, and
wherein the secondary storage computing device is further configured to store multiple data blocks indicated to be eligible for single instancing in the one or more memory buffers.

3. The system of claim 1, wherein the secondary storage computing device is further configured to, for at least some of the multiple data blocks indicated to be eligible for single instancing, generate a unique identifier for each data block.

4. The system of claim 1, wherein the indication is a single flag.

5. The system of claim 1, further comprising:
one or more storage devices storing multiple data blocks in one or more container files;
one or more single instance databases storing, for at least some of the multiple data blocks,
an identifier of a stored data block, and
a location of the stored data block in a container file; and
one or more index files storing, for at least some of the multiple data blocks, an indication whether the stored data block is referred to in one or more metadata files on the one or more storage devices.

6. The system of claim 5, wherein the secondary storage computing device is further configured to:
receive an indication to delete one or more data blocks stored in the one or more container files; and
for at least some of the one or more data blocks indicated to be deleted:
determine a reference count of the data block; and
when the reference count of the data block is zero, update one or more index files to indicate that the data block is not referred to; and
when a threshold number of contiguous data blocks in a container file that are not referred to is reached, make available for storage portions of one or more physical media corresponding to the threshold number of contiguous data blocks.

7. The system of claim 5, wherein the one or more single instance databases maintain:
a data structure storing, for at least some of the multiple data blocks, a location of a reference to the data block.

8. The system of claim 1, wherein the secondary storage computing device is further configured to:
determine if a container file contains any referenced data blocks; and
when the container file does not contain any referenced data blocks, delete the container file.

9. The system of claim 1, wherein a file is determined to be eligible for single instancing when the file is a system file, an application file, or a user file.

10. The system of claim 1, wherein a file is determined to be ineligible for single instancing when the file comprises metadata.

11. The system of claim 10, wherein the metadata is one of:
access control lists (ACLs),
disk partition information,
Master File Table (MFT), and
File Allocation Table (FAT) information.

12. A method for storing a single instance of a data block in a data storage network, the method comprising:
accessing files on which one or more data storage jobs are performed;
determining a first set of one or more files that are not eligible for single instancing and a second set of one or more files that are eligible for single instancing, wherein the first and second set of one or more files are determined according to one or more parameters provided in an information management policy assigned to a storage device storing the files;
dividing the first and second set of one or more files into multiple data blocks; and
providing the multiple data blocks to a secondary storage computing device in one or more data streams,
wherein the one or more data streams comprises multiple stream header items, wherein each stream header item containing an indication of whether associated data block is eligible for single instancing.

13. The method of claim 12, wherein the method further comprises generating a unique identifier for each data block.

14. The method of claim 12, wherein the method further comprises:
receiving an indication to delete one or more data blocks stored in a secondary storage device; and
for at least some of the one or more data blocks indicated to be deleted:
determine a reference count of the data block; and
when the reference count of the data block is zero, update one or more index files to indicate that the data block is not referred to; and
when a threshold number of contiguous data blocks in a container file that are not referred to is reached, make available for storage portions of one or more physical media corresponding to the threshold number of contiguous data blocks.

15. The method of claim 14, wherein the method further comprises:
determining if a container file contains any referenced data blocks; and
when the container file does not contain any referenced data blocks, deleting the container file.

16. The method of claim 12, wherein a file is determined to be eligible for single instancing when the file is a system file, an application file, or a user file.

17. The method of claim 12, wherein a file is determined to be ineligible for single instancing when the file comprises metadata.

18. A system for storing a single instance of a data block in a data storage network, the system comprising:
one or more computing devices, one or more computing devices configured to:
access files on which one or more data storage jobs are performed;
determine a first set of one or more files that are not eligible for single instancing and a second set of one or more files that are eligible for single instancing, wherein the first and second set of one or more files are determined according to one or more parameters provided in an information management policy associated with the one or more computing devices;
divide the first and second set of one or more files into multiple data blocks; and
provide the multiple data blocks to a secondary storage computing device in one or more data streams,
wherein the one or more data streams comprises multiple stream header items, wherein each stream header item containing an indication of whether associated data block is eligible for single instancing.

* * * * *